(12) United States Patent
Sano et al.

(10) Patent No.: US 8,295,150 B2
(45) Date of Patent: Oct. 23, 2012

(54) OPTICAL INFORMATION MEDIUM MEASUREMENT METHOD, OPTICAL INFORMATION METHOD, OPTICAL INFORMATION MEDIUM, RECORDING APPARATUS, AND REPRODUCING APPARATUS

(75) Inventors: Kousei Sano, Osaka (JP); Yoshiaki Komma, Osaka (JP); Yasumori Hino, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/071,914

(22) Filed: Mar. 25, 2011

(65) Prior Publication Data

US 2011/0170389 A1    Jul. 14, 2011

Related U.S. Application Data

(63) Continuation of application No. 12/559,766, filed on Sep. 15, 2009.

(60) Provisional application No. 61/096,979, filed on Sep. 15, 2008.

(30) Foreign Application Priority Data

Dec. 5, 2008  (JP) ................ 2008-311332

(51) Int. Cl.
*G11B 3/70*   (2006.01)
*G11B 7/00*   (2006.01)
*B32B 3/02*   (2006.01)
*G01B 11/28*  (2006.01)
*G01B 9/02*   (2006.01)

(52) U.S. Cl. ...... 369/283; 369/53.11; 369/94; 428/64.4; 356/630; 356/447

(58) Field of Classification Search .......... 369/283, 369/275, 53.11, 53.2, 94, 100; 428/64.4; 356/447, 630

See application file for complete search history.

(56) References Cited

U.S. PATENT DOCUMENTS

| | | | |
|---|---|---|---|
| 6,469,977 B1 | 10/2002 | Kitaura | |
| 2003/0016619 A1 | 1/2003 | Judge et al. | |
| 2004/0037203 A1* | 2/2004 | Harigaya et al. | 369/100 |
| 2004/0190407 A1 | 9/2004 | Nobukuni | |

(Continued)

FOREIGN PATENT DOCUMENTS

JP    2006-40342    2/2006

(Continued)

OTHER PUBLICATIONS

International Search Report issued Nov. 24, 2009 in International (PCT) Application No. PCT/JP2009/004561.

(Continued)

*Primary Examiner* — Joseph Feild
*Assistant Examiner* — Aneeta Yodichkas
(74) *Attorney, Agent, or Firm* — Wenderoth, Lind & Ponack, L.L.P.

(57) ABSTRACT

Described is an optical information medium measurement method of measuring a degree of modulation in an optical information medium of a multilayered structure having a plurality of information layers. The method includes measuring the modulation degree of each layer of the optical information medium, by use of a measurement optical system, obtaining a thickness between layers of the optical information medium, obtaining a reflectance of each layer of the optical information medium, and converting the measured modulation degree of each layer into a modulation degree at a reference optical system differing from the measurement optical system, based on a value indicative of the obtained thickness between layers and a value indicative of the obtained reflectance of each layer.

11 Claims, 16 Drawing Sheets

U.S. PATENT DOCUMENTS

| | | | |
|---|---|---|---|
| 2004/0246835 A1 | 12/2004 | Nobukuni et al. | |
| 2006/0092821 A1 | 5/2006 | Tsukagoshi et al. | |
| 2007/0097808 A1 | 5/2007 | Maruyama et al. | |
| 2007/0237062 A1* | 10/2007 | Shinotsuka et al. | 369/275.2 |
| 2008/0019261 A1 | 1/2008 | Nakai et al. | |
| 2008/0084800 A1* | 4/2008 | Sekiguchi et al. | 369/47.53 |
| 2009/0046565 A1* | 2/2009 | Yuzurihara et al. | 369/116 |
| 2009/0067313 A1 | 3/2009 | Shiono et al. | |
| 2010/0128590 A1 | 5/2010 | Sano et al. | |
| 2010/0142348 A1 | 6/2010 | Sano et al. | |

FOREIGN PATENT DOCUMENTS

| | | |
|---|---|---|
| JP | 2006-127636 | 5/2006 |
| JP | 2007-257759 | 10/2007 |
| JP | 2007-272992 | 10/2007 |
| JP | 2007-305292 | 11/2007 |
| JP | 2008-27481 | 2/2008 |
| JP | 2008-287847 | 11/2008 |
| WO | 2007/108507 | 9/2007 |

OTHER PUBLICATIONS

Office Action dated Apr. 4, 2011 in U.S. Appl. No. 12/559,740, filed Sep. 15, 2009 (Sano et al.).

Office Action dated Apr. 4, 2011 in U.S. Appl. No. 12/559,766, filed Sep. 15, 2009 (Sano et al.).

Office Action mailed Jan. 20, 2012 in corresponding U.S. Appl. No. 12/559,766.

* cited by examiner

APPARENT DEGREE OF MODULATION md1 = Ipp/Itop

APPARENT DEGREE OF MODULATION mn1 = Ipp/Itop'

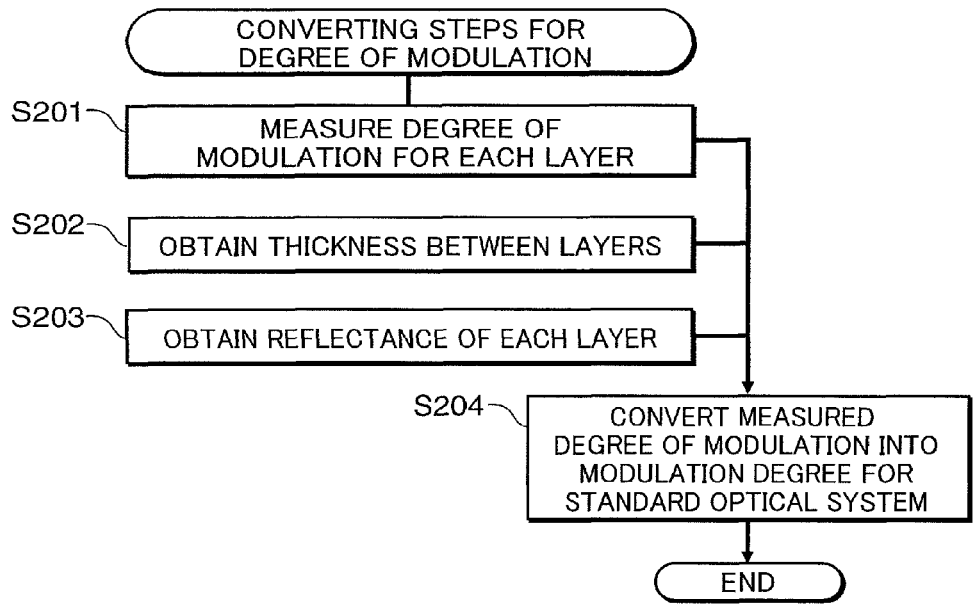
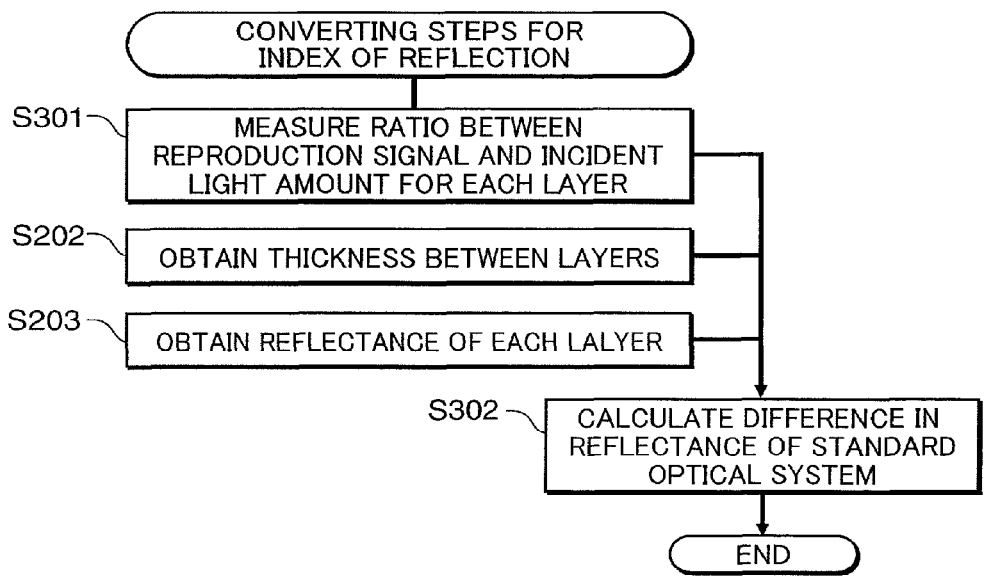

WITHOUT STRAY LIGHT FROM OTHER LAYERS

LEVEL IN CASE OF LIGHT AMOUNT = 0

DEGREE OF MODULATION $m = I_{pp}/I_{top}$

WITH STRAY LIGHT FROM OTHER LAYERS

LEVEL OF STRAY LIGHT FROM OTHER LAYERS
LEVEL IN CASE OF LIGHT AMOUNT = 0

APPARENT DEGREE OF MODULATION $m2 = I_{pp}/I_{top}' < m$ ns as the area of the light receiving section, the magnifica-
OPTICAL INFORMATION MEDIUM MEASUREMENT METHOD, OPTICAL INFORMATION METHOD, OPTICAL INFORMATION MEDIUM, RECORDING APPARATUS, AND REPRODUCING APPARATUS This application is a Continuation of U.S. application Ser. No. 12/559,766, filed Sep. 15, 2009, which claims the benefit of Provisional application, U.S. Ser. No. 61/096,979, filed Sep. 15, 2008.

BACKGROUND OF THE INVENTION

1. Field of the Invention

The present invention relates to a measurement method for an optical information medium such as an optical disc.

2. Description of the Related Art

An optical memory technology that employs an optical disc as a high-density and large-capacity information memory medium has been increasingly applied to a digital audio disc, a video disc, a document file disc, and further, a data file and the like. According to the optical memory technology, information is recorded on the optical disc in a form of a minute pit or a minute record mark. Moreover, the information is recorded and reproduced with high accuracy and high reliability by a small focused light beam.

In a Blu-ray disc (BD) which is one of the optical disc, for example, a minute spot is formed in such a manner that a laser beam having a wavelength in a range from 400 nm to 410 nm, specifically, a wavelength of 405 nm is collected by an objective lens having an NA (Numerical Aperture) in a range from 0.84 to 0.86, specifically, an NA of 0.85.

When the pit or the record mark is reproduced by use of the light beam, a reproduction signal is generated. This reproduction signal needs to have a predetermined property in order to ensure stable reproduction thereof in different apparatuses. FIG. 8A shows an example of such a reproduction signal. As an index for measuring the property of the reproduction signal, adopted is a ratio between an amplitude $I_{pp}$ of an AC component of the reproduced signal and a signal maximum value $I_{top}$, i.e., a modulation degree m ($m=I_{pp}/I_{top}$). This modulation degree m needs to be equal to or more than a specific value to ensure compatibility of optical discs among optical disc devices. For this reason, it is possible to ensure the compatibility of the optical disc among optical disc devices by evaluating the optical disc based on a degree of modulation measured by an optical disc evaluation device (measurement optical system).

In the optical disc having a plurality of recording layers, a degree of modulation m is adversely affected by a reflected light (stray light) from other layers than a target reproduction layer. More specifically, in the case where the stray light is contained in the reproduction signal as shown in FIG. 8B, the signal maximum value $I_{top}'$ becomes larger by the stray light as compared to the signal maximum value $I_{top}$ without the stray light from other layers as shown in FIG. 8A. Consequently, a degree of modulation m2 with an effect of a stray light from other layers than the target reproduction layer is expressed by an equation of $m2=I_{pp}/I_{top}'$, which is disadvantageously smaller as compared to the degree of modulation m without the effect of stray light from other layers than the target reproduction layer.

Like the case of the conventional double-layered disc, when an amount of stray light, which is determined by the area of the light receiving section of the measurement optical system, the magnification of the detection system, and the thickness between layers, is smaller than a predetermined amount, it is possible to ensure the compatibility of optical discs among optical disc devices without problem by setting the degree of modulation m to be not smaller than the predetermined level without taking into consideration such conditions as the area of the light receiving section, the magnification of the detection system, etc.

To ensure stable reproduction among different reproduction apparatuses, a value indicative of the difference in reflectance between layers of a multilayered disc needs to be set within a predetermined range.

Specifically, the difference in reflectance between layers needs to be set in the above range to suppress abrupt changes in signal amplitude when a light beam is moved between the layers or the effect of the stray light from other layers. Namely, in the case where a large difference in reflectance exists between layers, the layer of low reflectance is liable to be affected by large stray light from the layer of higher reflectance, which would significantly affect the degree of modulation of a signal. In contrast, like the conventional double-layered disc, in the case where an amount of stray light, which is determined by the area of the light receiving section of the measurement optical system, the magnification of the detection system, and the thickness between layers, is smaller than a predetermined amount, the compatibility of optical discs among optical disc devices can be ensured without problem by setting the reflectance to fall in the predetermined range without taking such conditions as the area of the light receiving section, the magnification of the detection system, etc. into consideration.

Recently, to increase the recording capacity of the optical disc, practical applications of optical discs wherein a recording layer is made up of larger number of layers than two layers, such as a triple-layered recording layer, a quadric-layered recording layer, have been made into consideration. For such high density optical disc made up of three or four layers, it is required to reduce the thickness between the layers. With this structure, an amount of stray light that enters into the light receiving section increases as compared to the case of optical discs of double-layered structure, and therefore, the degree of modulation m, or the reflectance would be largely affected by the degree of modulation m or the reflectance would be significantly affected by factors of the optical system such as an area of the light receiving section, the magnification of the detecting system, and the interlayer thickness of the optical disc. Therefore, when adopting a value indicative of the degree of modulation m or a value indicative of the reflectance set in various measurement optical system, a problem arises in that the compatibility of optical discs cannot be ensured among optical disc devices.

As a solution, it may be considered to set predetermined fixed conditions of an optical system for measuring the degree of modulation m or the difference in reflectance, and the degree of modulation m or the difference in reflectance is measured under the fixed conditions as set. However, this countermeasure requires replacement of all optical systems in measuring machines which currently exist in the worldwide, and consequently such solution is far from reality.

PRIOR ART DOCUMENT

Patent Document 1: WO 2007/108507 A1

SUMMARY OF THE INVENTION

It is an object of the present invention to provide an optical information medium measurement method that allows correct comparison of a modulation degree or a difference in reflectance even when an optical information medium is subjected to measurement using any measurement optical system, without preparation of a special measurement optical system.

An optical information medium measurement method according to one aspect of the present invention for measuring a degree of modulation in an optical information medium of a multilayered structure having a plurality of information layers includes: a first step of measuring the modulation degree of each layer of the optical information medium, by use of a measurement optical system, a second step of obtaining a thickness between layers of the optical information medium, a third step of obtaining a reflectance of each layer of the optical information medium, and a fourth step of converting the modulation degree of each layer, the modulation degree being measured in the first step, into a modulation degree for the standard optical system differing from the measurement optical system, based on a value indicative of the thickness between layers, the thickness being obtained in the second step, and a value indicative of the reflectance of each layer, the reflectance being obtained in the third step.

According to the foregoing structure, the comparison of the modulation degree is corrected even when the optical information medium is subjected to measurement using any measurement optical system, without preparing a special measurement optical system.

An optical information medium measurement method according to another aspect of the present invention for measuring a difference in reflectance in an optical information medium of a multilayered structure having a plurality of information layers, includes a fifth step of obtaining an apparent reflectance corresponding to a ratio between a signal light amount and an incident light amount each obtained upon reproduction of information from each layer of the optical information medium, by use of a measurement optical system, a second step of obtaining a thickness between layers of the optical information medium, a third step of obtaining a reflectance of each layer of the optical information medium, and a sixth step of obtaining a result of conversion as a difference in reflectance for the reference optical system differing from the measurement optical system, from a value indicative of the apparent reflectance obtained in the fifth step, a value indicative of the thickness between layers, the thickness being obtained in the second step, and a value indicative of the reflectance of each layer, the reflectance being obtained in the third step.

According to the foregoing structure, the difference in reflectance is corrected even when the optical information medium is subjected to measurement using any measurement optical system, without preparation of a special measurement optical system.

Other objects, characteristics and advantages of the present invention shall be sufficiently clarified by the description herein below. The excellent aspects of the present invention shall be clarified in the following description with reference to the accompanying drawings.

BRIEF DESCRIPTION OF THE DRAWINGS

FIG. 6 is a conceptual diagram showing a modulation degree converting method in accordance with the first embodiment of the present invention.

FIG. 7 is a conceptual diagram showing a difference in reflectance calculating method in accordance with the second embodiment of the present invention.

DETAILED DESCRIPTION OF THE EMBODIMENTS OF THE INVENTION

With reference to the drawings, hereinafter, description will be given of preferred embodiments of the present invention.

First Embodiment

A method for converting a degree of modulation for each layer of a multilayered optical disc (an optical information medium) as measured by an arbitrary measurement optical system (an optical information medium evaluation apparatus), into a degree of modulation for each layer for the standard optical system in accordance with the first embodiment of the present invention is shown in FIG. 6. This modulation degree converting method includes four steps S201, S202, S203 and S204. The respective steps are described below. Herein, explanations will be given through the case of adopting an optical disc of a triple-layered structure.

(S201: Step of Measuring a Degree of Modulation for each Layer)

In S201, the degree of modulation is measured for each layer of the optical disc, by the measurement optical system. More specifically, the measurement optical system measures the degree of modulation for each layer, based on a reproduction signal obtained by reproducing information recorded on each layer (e.g., the first layer, the second layer, the third layer) of the optical disc.

Figure 4:
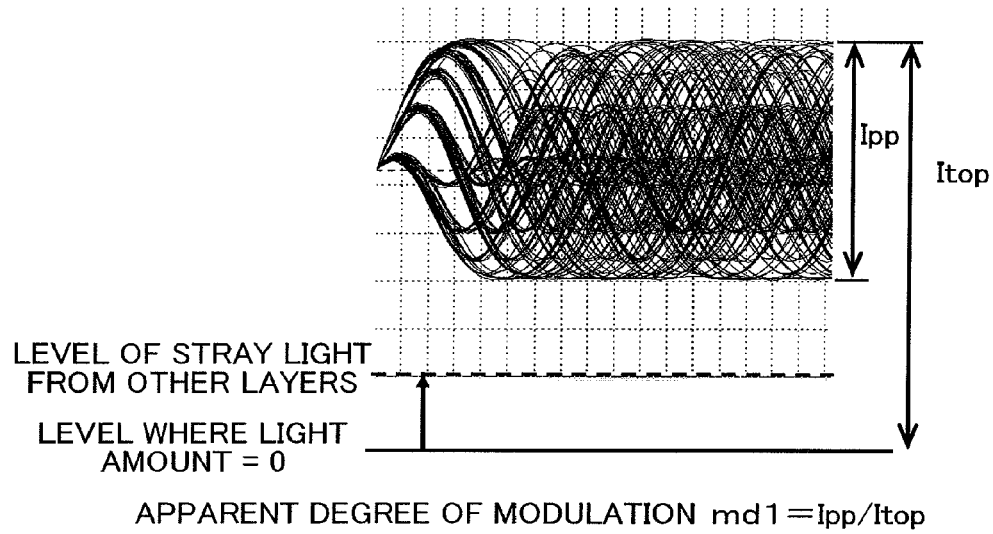
FIG. 4 is a waveform chart showing an example of a pattern of a measured reproduction signal, in accordance with the first embodiment of the present invention.

FIG. 4 shows an example of the reproduction signal in the measurement optical system. The modulation degree is obtained as a ratio between an amplitude $I_{pp}$ of an AC component of the reproduction signal and a signal maximum value $I_{top}$ ($I_{pp}/I_{top}$). A reproduction signal obtained by reproduction of information from a layer subjected to measurement contains a component of stray light reflected from other layers. Accordingly, the degree of modulation of each layer is measured by the measurement optical system, and the measured value contains unique stray light from other layers generated in the measurement optical system. Hereinafter, the measured value for the degree of modulation affected by the stray light from other layers is referred to as an "apparent degree of modulation".

The apparent modulation degrees measured by the measurement optical system, i.e., the apparent modulation degree of the first layer, the apparent modulation degree of the second layer and the apparent modulation degree of the third layer are represented by $md_1$, $md_2$ and $md_3$, respectively.

S202: Step of Obtaining Thickness Between Layers

In S202, a thickness between layers of the optical disc is obtained. The thickness between layers of the optical disc may be actually measured using an optical disc to be subjected to measurement and a measuring machine. Moreover, the thickness between layers may take a value such as a design value (a target thickness when manufacturing an optical disc) or an average value of variations upon mass-production of the optical disc (an average thickness in a case of manufacture of a plurality of optical information media). For the thickness between layers, a standard value as specified in accordance with optical disc specifications and the like may be adopted.

S203: Step of Obtaining Reflectance of each Layer

Figure 1A:
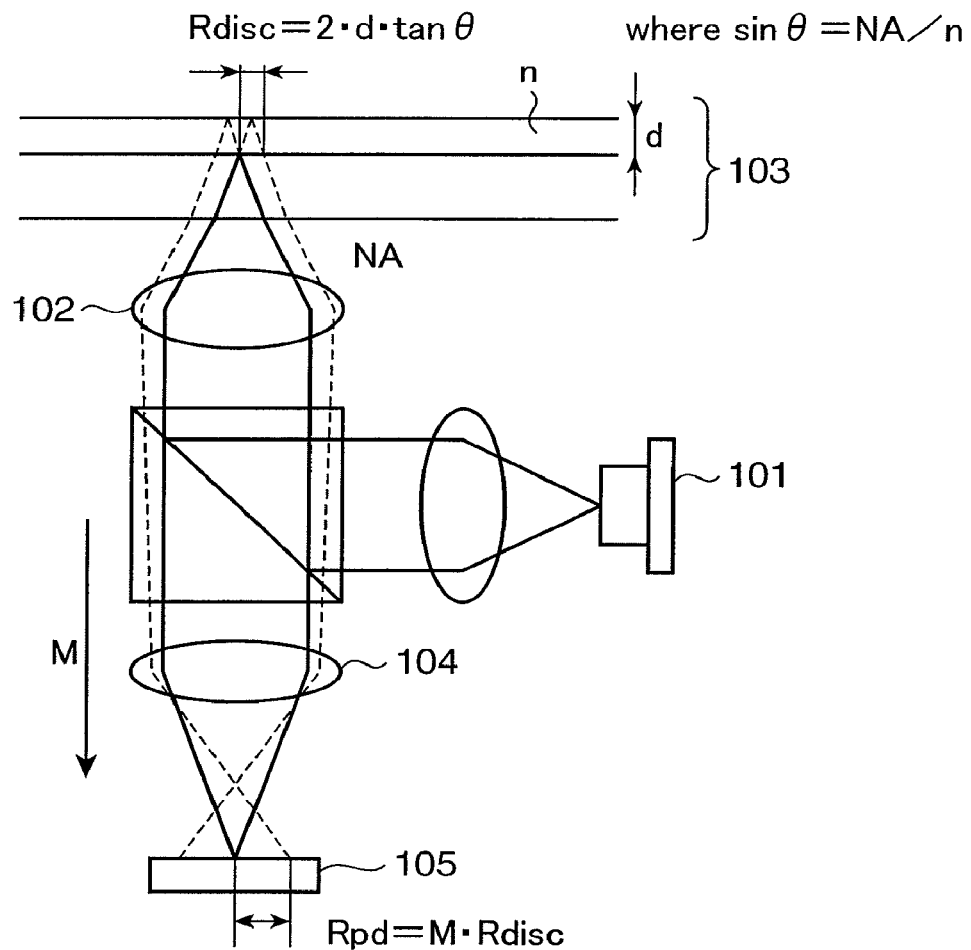
FIG. 1A is an explanatory diagram showing a relation between a measurement optical system and stray light from an optical information medium, in accordance with the first embodiment of the present invention.

In S203, a reflectance of each layer of the optical disc is obtained. FIG. 1A which explains S203 shows a schematic structure of the measurement optical system. The measurement optical system is provided with a light source 101, an objective lens 102, a detection lens 104, a photodetector 105 and the like. With reference to FIG. 1A, explanations will be given on a relation between a light receiving part of the measurement optical system and the stray light reflected from other layers.

Figure 1B:
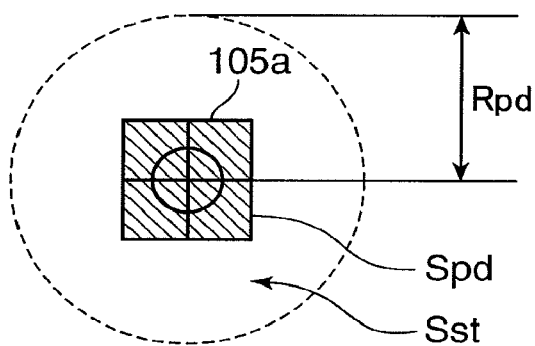
FIG. 1B is an explanatory diagram showing a relation between a photodetector of the measurement optical system and the stray light.

A light beam emitted from the light source 101 is converged by the objective lens 102 onto the specific information layer (the layer subjected to measurement) of the optical disc 103 (the optical information medium). Light reflected from the optical disc 103 passes through the objective lens 102 again, is collected by the detection lens 104, and enters the photodetector 105, to be converted into an electric signal according to an amount of light. As shown in FIG. 1B, the photodetector 105 has the light receiving part 105a. The detecting system of the measurement optical system has a magnification M which is usually obtained from a ratio between a focal distance of the detection lens 104 and a focal distance of the objective lens 102. In FIGS. 1A and 1B, the stray light reflected from other layers than the layer subjected to measurement is shown with a broken line, for convenience.

An area ratio between an area of extension of the stray light from other layers on the light receiving part 105a and an area of the light receiving part 105a is determined from the detection magnification M of the measurement optical system, the area $S_{pd}$ of the light receiving part 105a, a distance d between the layer subjected to measurement and the other layer, a refractive index n of an intermediate layer formed between the respective information layers, and a numerical aperture NA of the measurement optical system.

The stray light reflected from the other layer has a radius $R_{disc}$ on the layer on which the light is converged is approximately expressed by the following equation.

$$R_{disc} \approx NA \cdot 2 \cdot d/n \quad (1\text{-}1)$$

To be more specific, it is assumed that a value indicative of θ satisfies a relation of sin θ=NA/n and falls within a range from 0 to π/2 (0<θ<π/2). Thus, the radius $R_{disc}$ is expressed by the following equation.

$$R_{disc} = 2 \cdot d \cdot \tan\theta \quad (1\text{-}2)$$

The stray light on the light receiving part 105a is applied with the magnification M of the detecting system. Therefore, a radius $R_{pd}$ of the stray light on the light receiving part 105a is expressed by the following equation.

$$R_{pd} = M \cdot R_{disc} \quad (1\text{-}3)$$

Accordingly, the area $S_{st}$ of extension of the stray light on the light receiving part 105a is expressed by the following equation.

$$S_{st} = \pi \cdot R_{pd}^2 \quad (1\text{-}4)$$

The ratio between the area $S_{st}$ of extension of the stray light and the area $S_{pd}$ of the light receiving part 105a corresponds to a stray light leakage factor ($S_{pd}/S_{st}$). The stray light leakage factor ($S_{pd}/S_{st}$) is expressed by the following equation based on the equation (1-1).

$$S_{pd}/S_{st} \approx S_{pd}/\{\pi \cdot (M \cdot NA \cdot 2 \cdot d/n)^2\} \quad (1\text{-}5)$$

Alternatively, the stray light leakage factor ($S_{pd}/S_{st}$) is expressed by the following equation based on the equation (1-2).

$$S_{pd}/S_{st} = S_{pd}/\{\pi \cdot (M \cdot NA \cdot 2 \cdot d \cdot \tan\theta)^2\} \quad (1\text{-}6)$$

In this equation, each of the parameters d and n depends on the optical disc 103, and the parameter NA relates to the light collecting system of the measurement optical system. The remaining parameter $S_{pd}/M^2$ is determined based on the detecting system of the measurement optical system, and is obtained by dividing the area $S_{pd}$ of the light receiving part 105a by a square of the magnification M of the detecting system. This parameter corresponds to a result of conversion of a size of the light receiving part into a scale on the optical disc, and is referred to as normalize light receiving part size.

Next, explanations will be given on the method for obtaining the reflectance of each layer of the multilayered disc. Typically, a reflectance is, in a case where a light beam from an objective lens is converged onto a specific layer of an optical disc (an optical information medium), a ratio of an amount of light which is reflected from only the specific layer and outgoes from the optical information medium to an amount of light which enters the optical information medium.

Figure 2:
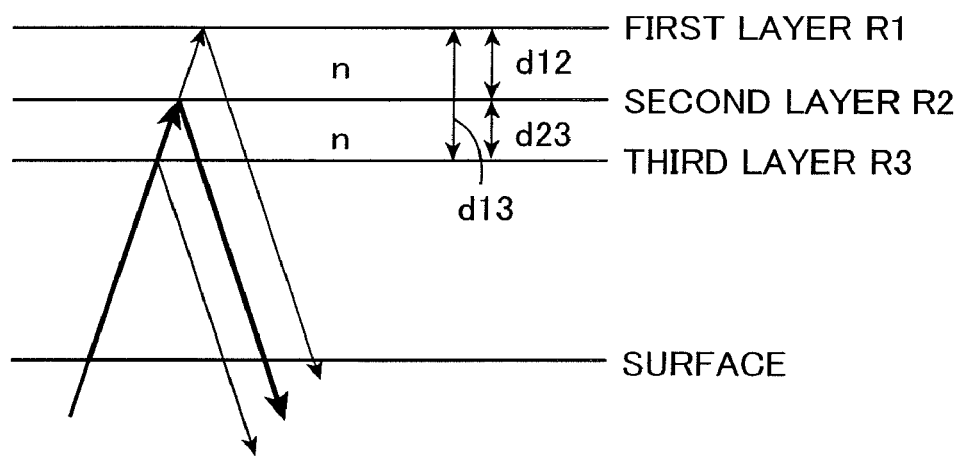
FIG. 2 is a conceptual diagram showing a triple-layered optical information medium and an optical path, in accordance with the first embodiment of the present invention.

With reference to FIG. 2, explanations will be given through the case of adopting the triple-layered optical disc. In the optical disc, the reflectance of the first layer is represented by $R_1$, the reflectance of the second layer is represented by $R_2$, and the reflectance of the third layer is represented by $R_3$. Moreover, the distance between the first and second layers is represented by $d_{12}$, the distance between the first and third layers is represented by $d_{13}$, and the distance between the second and third layers is represented by $d_{23}$. Further, the refractive index of the intermediate layer is represented by n, and the numerical aperture of the measurement optical system is represented by NA. Herein, the relation of $\sin \theta = NA/n$ is satisfied. Furthermore, the normalize light receiving part size of the detecting system of the measurement optical system is represented by Sd.

An apparent reflectance corresponds to an amount obtained by standardizing, with the incident light amount, the light amount in the reproduction signal (containing the stray light) which can be measured by the measurement optical system when reproducing information from the i-th layer of the optical disc. Herein, the apparent reflectance is represented by $S_i$. The apparent reflectance $S_1$ of the first layer is represented as a sum of the reflectance $R_1$ of the first layer and a reflectance conversion value indicative of the stray light from the second layer and a reflectance conversion value indicative of the stray light from the third layer.

It is assumed that the incident light amount is represented by I. Thus, an amount ($St_2$) of the stray light from the second layer is expressed by the following equation based on the equation (1-6).

$$St_2 = I \times R_2 \times S_{pd} / \{\pi \cdot (M \cdot 2 \cdot d_{12} \cdot \tan \theta)^2\} \quad (1\text{-}7)$$

Herein, the normalize light receiving part size $S_{pd}/M^2$ of the detecting system of the measurement optical system can also be represented by Sd. Thus, the equation (1-7) turns into the following equation.

$$St_2 = I \times R_2 \times Sd / \{\pi \cdot (2 \cdot d_{12} \cdot \tan \theta)^2\} \quad (1\text{-}8)$$

The reflectance conversion value indicative of the stray light from the second layer can be obtained from a relation of $St_2/I$, and therefore is expressed by the following equation.

$$St_2/I \times Sd \times R_2 / \{\pi \cdot (2 \cdot d_{12} \cdot \tan \theta)^2\} \quad (1\text{-}9)$$

Similarly, the reflectance conversion value indicative of the stray light from the third layer can be obtained from a relation of $St_3/I$, and therefore is expressed by the following equation.

$$St_3/I \times Sd \times R_3 / \{\pi \cdot (2 \cdot d_{13} \cdot \tan \theta)^2\} \quad (1\text{-}10)$$

Based on the equation (1-9) and the equation (1-10), the apparent reflectance $S_1$ of the first layer is expressed by the following equation.

$$S_1 = R_1 + Sd \cdot [R_2/\{\pi(2 \cdot d_{12} \cdot \tan \theta)^2\} + R_3/\{\pi(2 \cdot d_{13} \cdot \tan \theta)^2\}] \quad (1\text{-}11)$$

Similarly, the apparent reflectance $S_2$ of the second layer is expressed by the following equation.

$$S_2 = R_2 + Sd \cdot [R_1/\{\pi(2 \cdot d_{12} \cdot \tan \theta)^2\} + R_3/\{\pi(2 \cdot d_{23} \cdot \tan \theta)^2\}] \quad (1\text{-}12)$$

Moreover, the apparent reflectance $S_3$ of the third layer is expressed by the following equation.

$$S_3 = R_3 + Sd \cdot [R_1/\{\pi(2 \cdot d_{13} \cdot \tan \theta)^2\} + R_2/\{\pi(2 \cdot d_{23} \cdot \tan \theta)^2\}] \quad (1\text{-}13)$$

In a case of considering a typical multilayered disc having "N" layers ($2 \leq N$, N: an integer), an apparent reflectance $S_i$ of the i-th layer is expressed by the following equation.

$$S_i = R_i + Sd \cdot [\Sigma R_j / \{\pi(2 \cdot d_{ij} \cdot \tan \theta)^2\}] \quad (1\text{-}14)$$

($\Sigma$: addition of integers from 1 to N in a case of $j \neq i$, with regard to j)

($1 \leq i \leq N$, i: an integer)

($1 \leq j \leq N$, $i \neq j$, j: an integer)

Herein, each of the apparent reflectances $S_1$ to $S_3$ is actually measured by the measurement optical system. Moreover, each of the numerical aperture NA and the normalize light receiving part size Sd is already known and is determined by the measurement optical system. Further, each of the distance $d_{12}$, the distance $d_{13}$, the distance $d_{23}$ and the refractive index n can be obtained separately as the parameter of the optical disc. Accordingly, only the reflectances $R_1$ to $R_3$ are unknowns. The reflectances $R_1$ to $R_3$ of the respective layers each incurring no influence due to the stray light can be obtained in such a manner that the three equations, i.e., the equations (1-11) to (1-13) are solved with regard to the reflectances $R_1$ to $R_3$. These equations can be solved because there are three equations and three unknowns.

Figure 13:
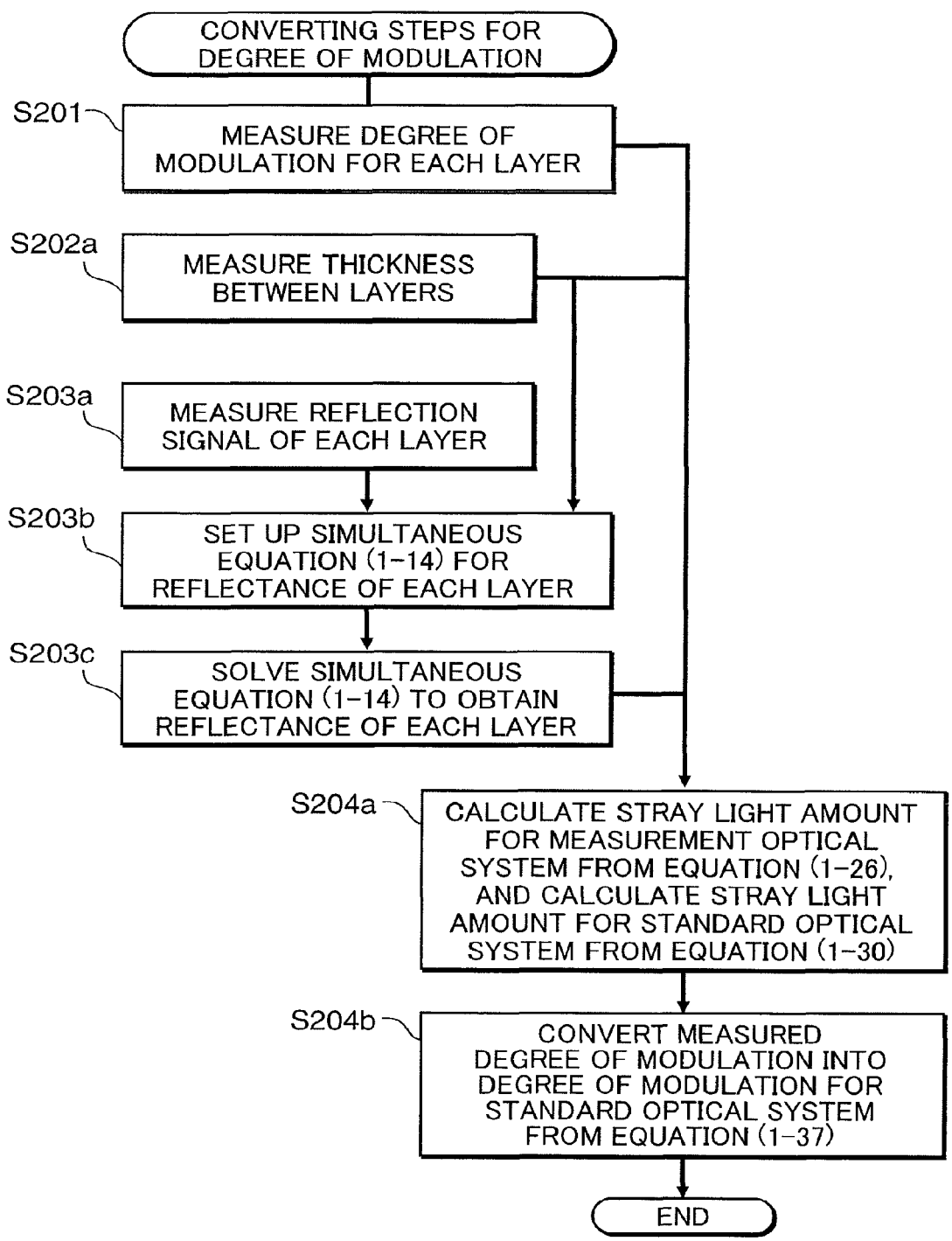
FIG. 13 is a conceptual diagram showing one example of a converting method for degree of modulation in accordance with the first embodiment of the present invention.
Figure 14:
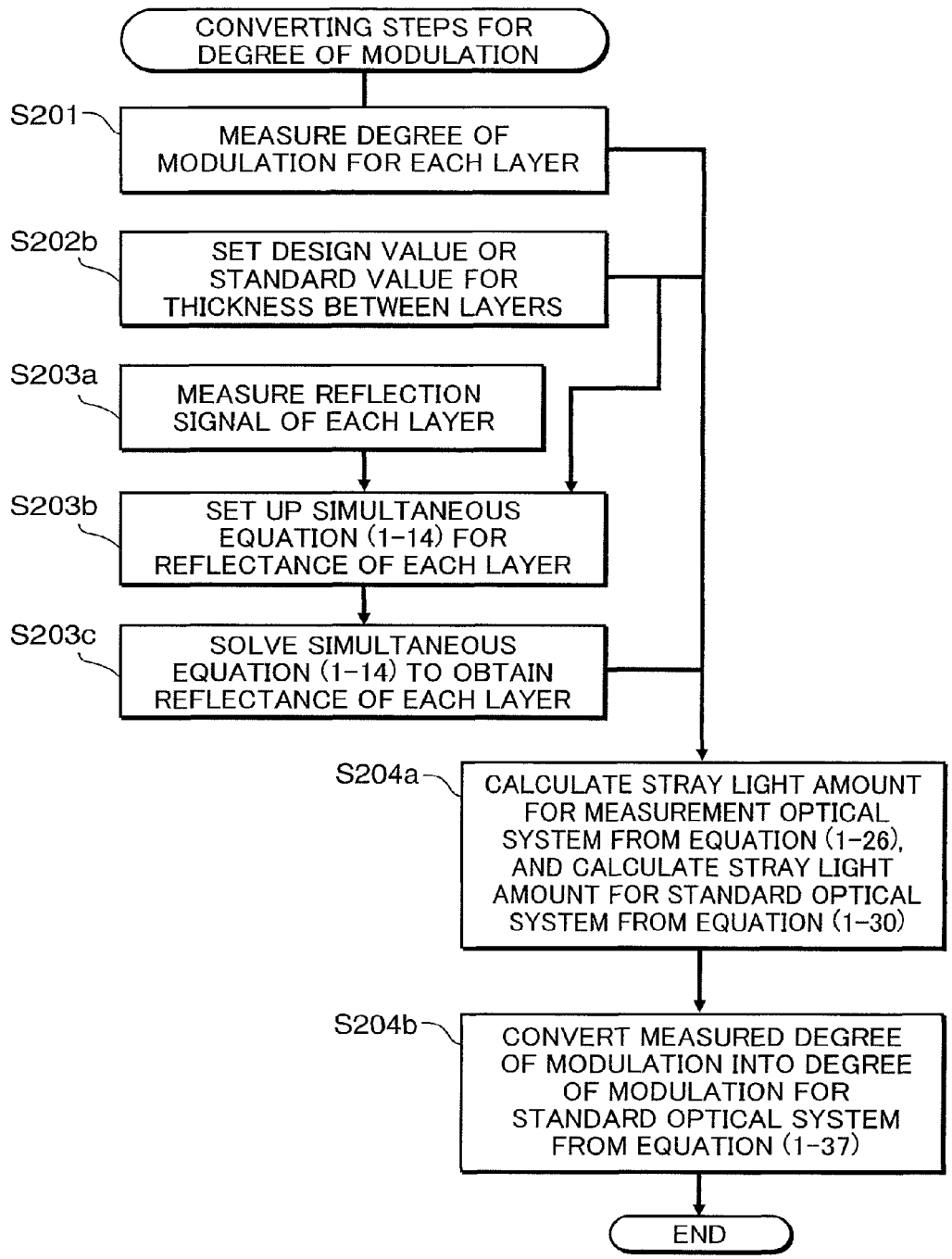
FIG. 14 is a conceptual diagram showing another example of a converting method for degree of modulation in accordance with the first embodiment of the present invention.
Figure 15:
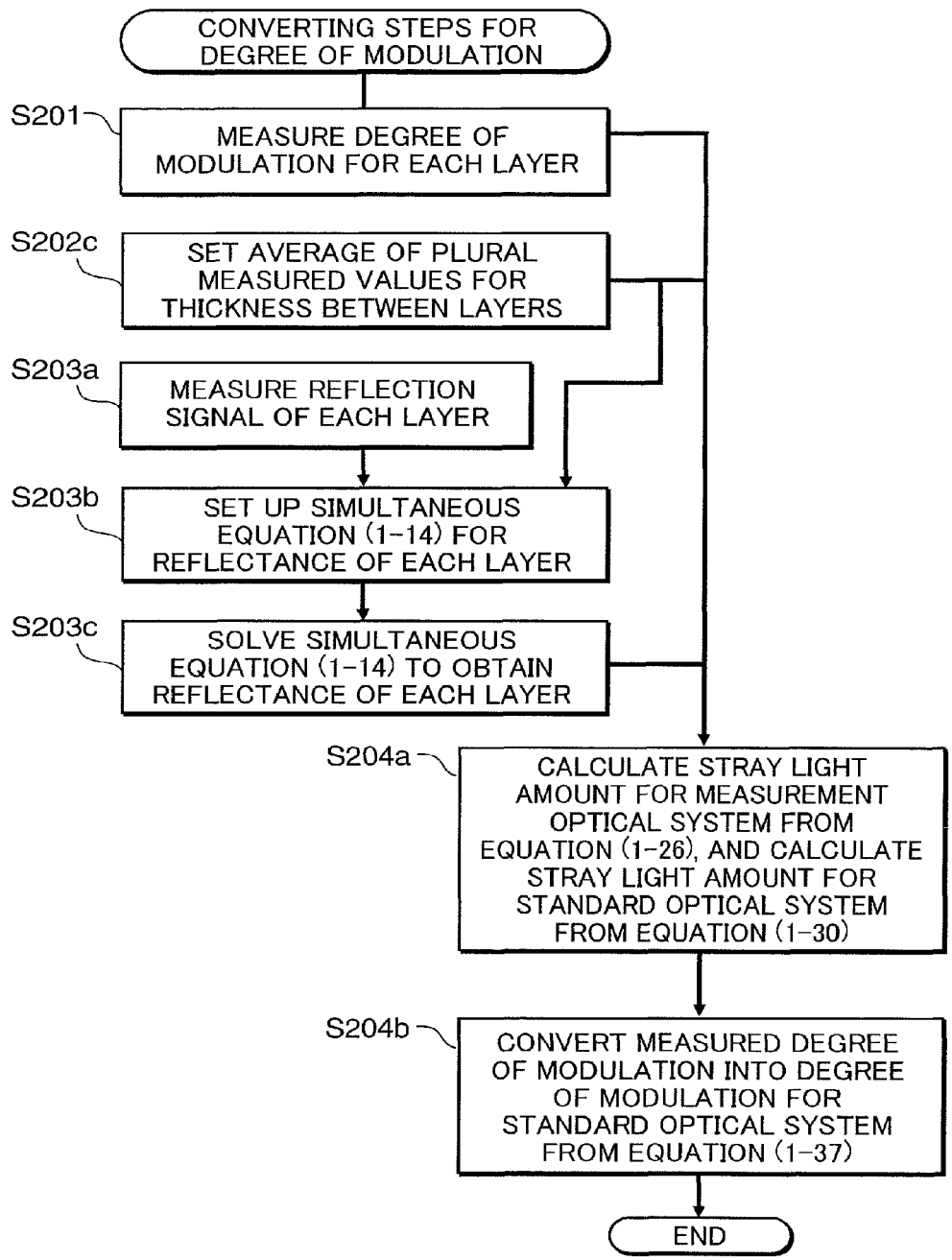
FIG. 15 is a conceptual diagram showing still another example of a converting method for degree of modulation in accordance with the first embodiment of the present invention.
Figure 16:
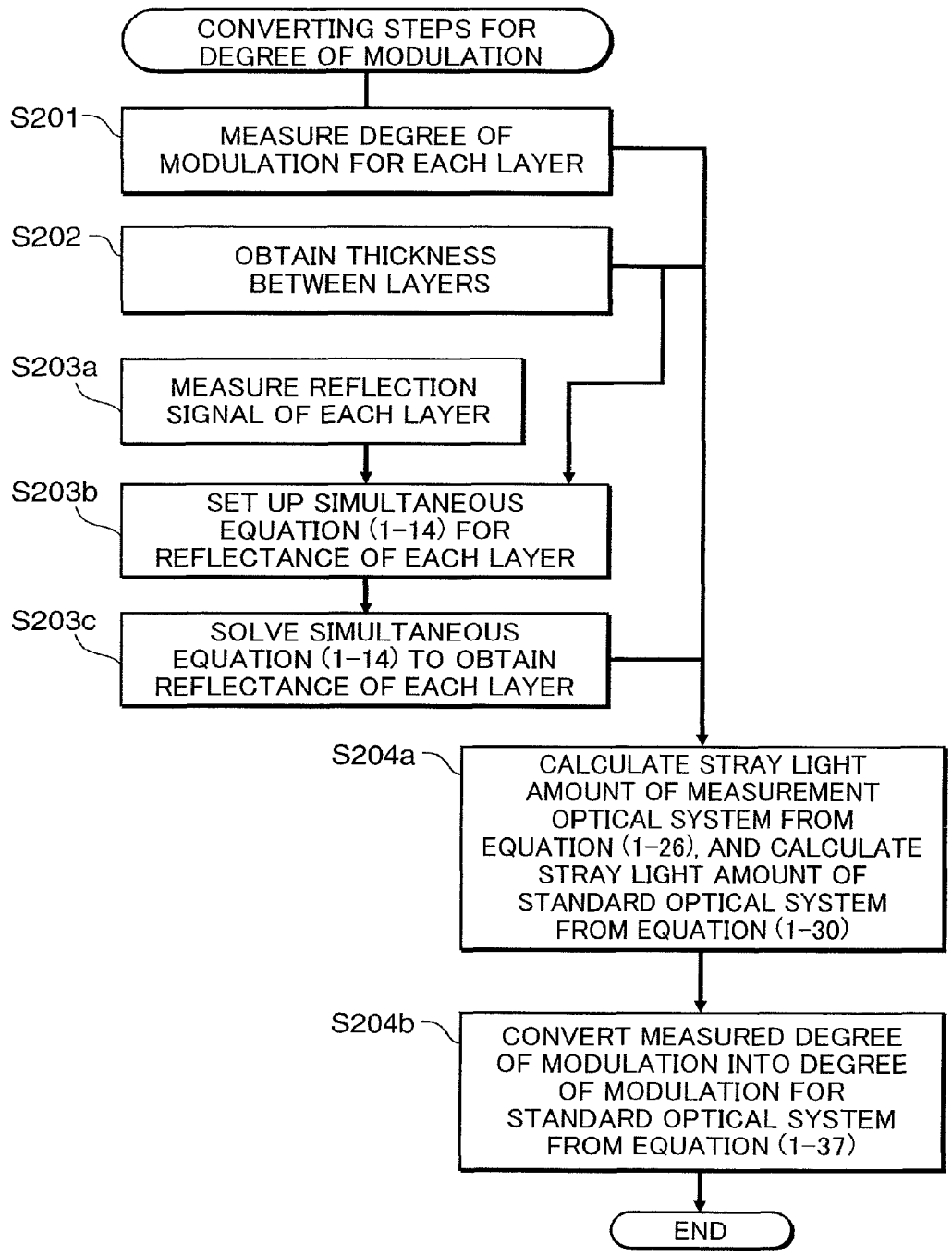
FIG. 16 is a conceptual diagram showing yet another example of a converting method for degree of modulation in accordance with the first embodiment of the present invention.

The value obtained in S202 (the step of obtaining the thickness between layers) is employed as the thickness between layers of the optical disc. For S202, S202a shown in FIG. 13, S202b shown in FIG. 14, or S202c shown in FIG. 15 may be selected. In S202a shown in FIG. 13, the thickness between layers is obtained by actually measuring the thickness between layers of the optical disc. In S202b shown in FIG. 14, the thickness between layers is obtained by employing a design value (target thickness when manufacturing an optical disc) or a standard value specified in accordance with specifications and the like as the thickness between layers of the optical disc. In S202c shown in FIG. 15, the thickness between layers is obtained by employing an average value of variations upon mass-production as the thickness between layers of the optical disc.

When adopting a measured value for the thickness $d_{12}$ between the first and second layers of the optical disc (S202a), it is possible to obtain more accurate values for the reflectances $R_1$ to $R_3$ of the respective layers. Moreover, when adopting a design value (target thickness when manufacturing optical disc) for the thickness between the layers (S202b) or an average value of the variations upon mass-production (S202c), the values obtained for reflectances $R_1$ to $R_3$ of the respective layers would contain some errors. However, it is advantageous in that the process of measuring the distance between the respective layers of the optical disc may be adopted. Therefore, it becomes possible to obtain these values with ease. Moreover, the standard value specified in accordance with the specifications and the like may be used as the value indicative of the thickness between the respective layers (S202b).

Figure 9:
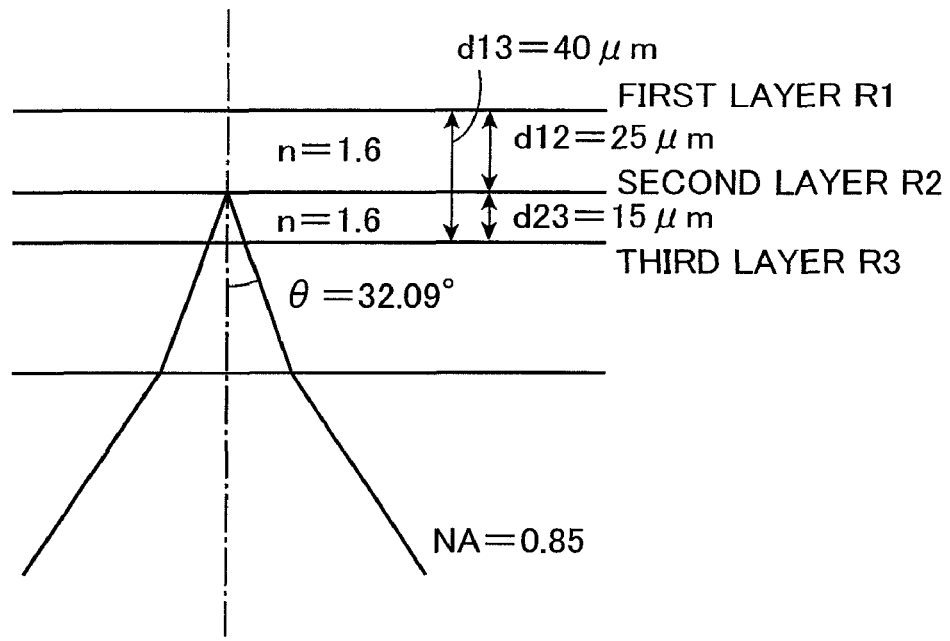
FIG. 9 is a conceptual diagram showing a specific example of a structure of the triple-layered optical information medium, in accordance with the first embodiment of the present invention.

An example is shown below for concrete numeric values. As an example, it is considered that the numerical aperture NA is 0.85, the refractive index n is 1.60, the distance $d_{12}$ is 25 μm, and the distance $d_{23}$ is 15 μm (FIG. 9). Herein, it is assumed that the detector has the square size of 120 μm×120 μm, and the magnification M of the detecting system is 20. Thus, the normalize light receiving part size Sd of the measurement optical system is 36 μm². In this case, the relations of sin θ=NA/n=0.531, θ=32.09° and tan θ=0.627 are satisfied. Accordingly, the three equations (1-11) to (1-13) are expressed by the following equation.

$$S_1 = R_1 + 0.01166 \cdot R_2 + 0.00455 \cdot R_3$$

$$S_2 = 0.01166 \cdot R_1 + R_2 + 0.03238 \cdot R_3 \quad (1\text{-}15)$$

$$S_3 = 0.00455 \cdot R_1 + 0.03238 \cdot R_2 + R_3$$

When the above equations are solved for the reflectance $R_i$, the following equations are given.

$$R_1 = 1.00015 \cdot S_1 - 0.01152 \cdot S_2 - 0.00418 \cdot S_3$$

$$R_2 = -0.01152 \cdot S_1 + 1.00118 \cdot S_2 - 0.03237 \cdot S_3 \quad (1\text{-}16)$$

$$R_3 = -0.00418 \cdot S_1 - 0.03237 \cdot S_2 + 1.00107 \cdot S_3$$

Based on the equation (1-16), the actual reflectance $R_i$ of the i-th layer can be obtained from the apparent reflectance $S_i$ of the i-th layer, the apparent reflectance $S_i$ being measured by the measurement optical system. In the case where the standard value specified in accordance with the specifications is used as the value indicative of the thickness between layers, the coefficient obtained based on the equation (1-16) does not vary as long as the normalize light receiving part size is fixed. Accordingly, the reflectance $R_i$ can be calculated from the measured value (the apparent reflectance $S_i$), based on the same formula for conversion, as long as the same measurement optical system is used.

Figure 3:
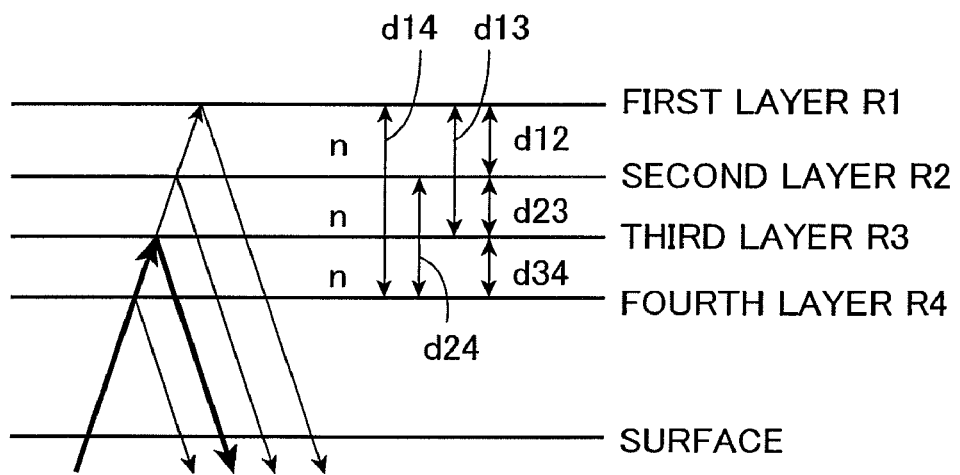
FIG. 3 is a conceptual diagram showing a quadric-layered optical information medium and an optical path, in accordance with the first embodiment of the present invention.

In the foregoing preferred embodiment, explanations have been given through the case of adopting the optical disc of triple layered structure. However, irrespectively of the number of layers (three layers, or four layers (FIG. 3)), the number of equations and the number of unknowns do not vary as long as the number of layers is not less than three, so that the equation can be solved. Therefore, it becomes possible to obtain the reflectance of each layer.

In the case of considering the multilayered disc having the "N" layers (2≦N, N: an integer), the apparent reflectance $S_i$ of the i-th layer (1≦i≦N, i: an integer) can be generalized as the equation (1-14), so that "N" simultaneous equations can be established, in which the reflectance $R_i$ is an unknown. As described, S203 of obtaining the reflectance of each layer can be realized by carrying out S203a of measuring a reflection signal of each layer of the optical disc, by the measurement optical system, S203b of establishing the simultaneous equation (1-14) with regard to the reflectance $R_i$ of each layer, and S203c of solving the simultaneous equation (1-14) to obtain the reflectance $R_i$ of each layer.

As an alternative of S203 obtaining the reflectance of each layer, further, an approximate expression may be established in consideration of the influence from only the adjacent layer, with regard to the simultaneous equation described above. In the case of the triple-layered disc, for example, the influence from the third layer upon reproduction of information from the first layer can be neglected because the distance between the third layer and the first layer is longer than the distance between the second layer and the first layer. The influence due to the stray light is reduced by an amount corresponding to a square of the distance; therefore, the influence from the third layer is usually reduced to about ¼ as compared with the influence from the second layer. For this reason, the reflectance can be obtained approximately in consideration of only the influence from the adjacent layer. In this case, the following three simultaneous equations are established.

$$S_1 = R_1 + Sd \cdot R_2 / \{\pi(2 \cdot d_{12} \cdot \tan \theta)^2\} \quad (1\text{-}17)$$

$$S_2 = R_2 + Sd \cdot [R_1 / \{\pi(2 \cdot d_{12} \cdot \tan \theta)^2\} + R_3 / \{\pi(2 \cdot d_{23} \cdot \tan \theta)^2\}] \quad (1\text{-}18)$$

$$S_3 = R_3 + Sd \cdot R_2 / \{\pi(2 \cdot d_{23} \cdot \tan \theta)^2\} \quad (1\text{-}19)$$

In the case of considering the typical multilayered disc having the "N" layers (2≦N, N: an integer), it is assumed that the adjacent layers of the i-th layer are defined as the j-th layer and the k-th layer. Thus, the apparent reflectance $S_i$ of the i-th layer is expressed by the following equation.

$$S_i = R_i + Sd \cdot [R_j / \{\pi(2 \cdot d_{ij} \cdot \tan \theta)^2\} + R_k / \{\pi(2 \cdot d_{ik} \cdot \tan \theta)^2\}] \quad (1\text{-}20)$$

(1≦i≦N, i: an integer)
(j=i−1, K=i+1)
(in a case of i=1, $R_j / \{\pi(2 \cdot d_{ij} \cdot \tan \theta)^2\} = 0$
in a case of i=N, $R_k / \{\pi(2 \cdot d_{ik} \cdot \tan \theta)^2\} = 0$)

In the case of the "N" layers, the number of items in the simultaneous equation (1-20) can be reduced from $N^2$ to 3N−2. Therefore, in a case of a multilayered disc having four or more layers, a frequency of calculations can be reduced significantly although this effect is not so much remarkable in the case of a disc of a triple-layered structure. Accordingly, it becomes possible to obtain the reflectance $R_i$ of each layer with ease.

Also in this case, it is assumed that the numerical aperture NA is 0.85, the refractive index n is 1.60, the distance $d_{12}$ is 25 μm, the distance $d_{23}$ is 15 μm, the detector has the square size of 120 μm×120 μm, and the magnification M of the detecting system is 20, as in the specific example described above. Herein, the normalize light receiving part size is 36 μm², and the relations of sin θ=NA/n=0.531, θ=32.09°, tan θ=0.627 are satisfied.

Accordingly, the three equations in this case, i.e., the equations (1-17) to (1-19) are expressed by the following equation.

$$S_1 = R_1 + 0.01166 \cdot R_2$$

$$S_2 = 0.01166 \cdot R_1 + R_2 + 0.03238 \cdot R_3 \quad (1\text{-}21)$$

$$S_3 = 0.03238 \cdot R_2 + R_3$$

Herein, when the above equations are solved for the reflectance $R_i$, the following equations are given.

$$R_1 = 1.00014 \cdot S_1 - 0.01167 \cdot S_2 - 0.00378 \cdot S_3$$

$$R_2 = -0.01167 \cdot S_1 + 1.00118 \cdot S_2 - 0.03242 \cdot S_3 \quad (1\text{-}22)$$

$$R_3 = -0.00378 \cdot S_1 - 0.03242 \cdot S_2 + 1.00105 \cdot S_3$$

Figure 17:
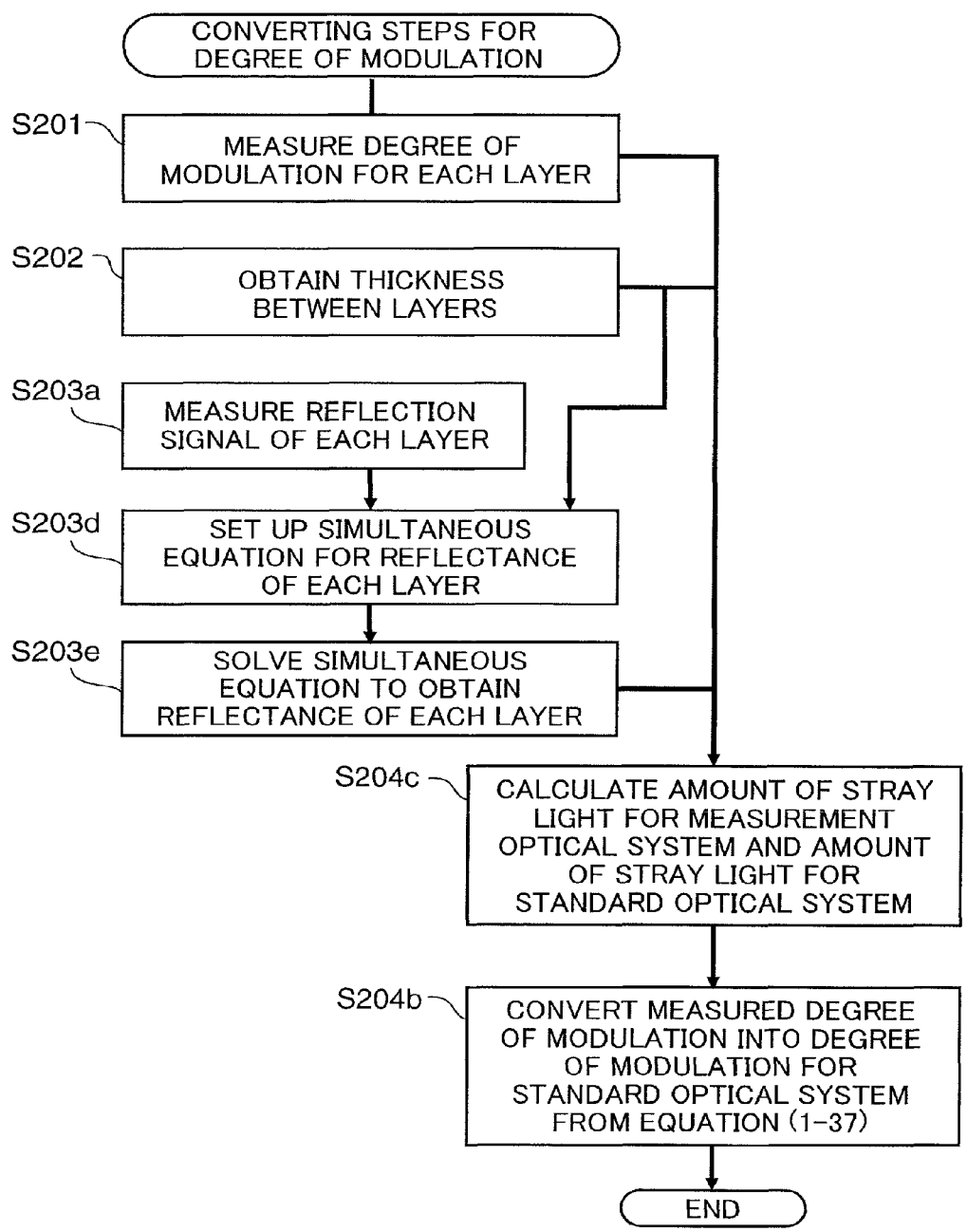
FIG. 17 is a conceptual diagram showing yet another example of a converting method for degree of modulation in accordance with the first embodiment of the present invention.

As described, S203 of obtaining the reflectance of each layer can be realized by carrying out S203a of measuring the reflection signal of each layer of the optical disc, by use of the measurement optical system, S203d of establishing the simultaneous equation (which may be either the equation (1-14) or (1-20)) for the reflectance $R_i$ of each layer, and S203e of solving the simultaneous equation to obtain the reflectance $R_i$ of each layer as shown in FIG. 17. (S204: Step of obtaining result of conversion as modulation degree at reference optical system)

In S204, the apparent degree of modulation measured by the measurement optical system is converted into a degree of modulation for the standard optical system. Herein, the modulation degree conversion for the optical disc of the triple-layered structure is described as an example. In S201 (the step of measuring the degree of modulation of each layer), the apparent degrees of modulation measured by the measurement optical system, i.e., the apparent degrees of modulation for the first layer, the second layer and the third layer are represented by $md_1$, $md_2$ and $md_3$, respectively. FIG. 4 shows an example of the reproduction signal of the first layer, the reproduction signal being measured by the measurement optical system. As described above, the apparent modulation degree $md_i$, of the i-th layer, the apparent modulation degree $md_i$ being measured by the measurement optical system, corresponds to the measured value which contains the unique stray light from other layers in the measurement optical system.

Herein, it is assumed that the refractive index of the intermediate layer is represented by n, the numerical aperture of the measurement optical system is represented by NA, and the normalize light receiving part size of the detecting system of the measurement optical system is represented by Sd. The ratio of the stray light from other layers to the light on each layer can be obtained from a product of the area ratio of the stray light (which is obtained based on the equation (1-6)) and the reflectance ratio between the respective layers. In the first layer, accordingly, the stray light amount $SS_1$ from other layers (in which the signal based on the amount of light from the first layer takes a value of 1) is expressed by the following equation.

$$SS_1 = Sd \cdot [R_2/\pi(2 \cdot d_{12} \cdot \tan \theta)^2\} + R_3/\{\pi(2 \cdot d_{23} \cdot \tan \theta)^2\}]/R_1 \quad (1\text{-}23)$$

Similarly, the stray light amount $SS_2$ in the second layer from other layers is expressed by the following equation.

$$SS_2 = Sd \cdot [R_1/\{\pi(2 \cdot d_{12} \cdot \tan \theta)^2\} + R_3/\{\pi(2 \cdot d_{23} \cdot \tan \theta)^2\}]/R_2 \quad (1\text{-}24)$$

Further, the stray light amount $SS_3$ in the third layer from other layers is expressed by the following equation.

$$SS_3 = Sd \cdot [R_1/\{\pi(2 \cdot d_{13} \cdot \tan \theta)^2\} + R_2/\{\pi(2 \cdot d_{23} \cdot \tan \theta)^2\}]/R_3 \quad (1\text{-}25)$$

In the case of considering the typical multilayered disc having the "N" layers ($2 \leq N$, N: an integer), the stray light amount $SS_i$ in the i-th layer from other layers in the measurement optical system is expressed by the following equation.

$$SS_i = Sd \cdot [\Sigma R_j/\{\pi(2 \cdot d_{ij} \cdot \tan \theta)^2\}]/R_i \quad (1\text{-}26)$$

($\Sigma$: addition of integers from 1 to N in a case of $j \neq i$, with regard to j)
($1 \leq i \leq N$, i: an integer)
($1 \leq j \leq N$, $i \neq j$, j: an integer)

In the case of considering the modulation degree (the apparent degree of modulation containing the stray light from other layers) in the reference optical system, moreover, the stray light from other layers needs to be taken into consideration. Herein, it is assumed that the area of the light receiving part of the reference optical system is represented by $Sn_{pd}$, the magnification of the detecting system of the reference optical system is represented by Mn, and the normalize light receiving part size of the reference optical system is represented by Sdn ($Sdn = Sn_{pd}/Mn^2$). Thus, the stray light from other layers amount $SSn_i$ (in which the signal from the first layer takes a value of 1) in the first layer at the reference optical system is expressed by the following equation.

$$SSn_1 = Sdn \cdot [R_2/\{\pi(2 \cdot d_{12} \cdot \tan \theta)^2\} + R_3/\{\pi(2 \cdot d_{13} \cdot \tan \theta)^2\}]/R_1 \quad (1\text{-}27)$$

Similarly, the stray light amount $SSn_2$ from other layers in the second layer for the standard optical system is expressed by the following equation.

$$SSn_2 = Sdn \cdot [R_1/\{\pi(2 \cdot d_{12} \cdot \tan \theta)^2\} + R_3/\{\pi(2 \cdot d_{23} \cdot \tan \theta)^2\}]/R_2 \quad (1\text{-}28)$$

Further, the stray light amount $SSn_3$ from other layers in the third layer at the reference optical system is expressed by the following equation.

$$SSn_3 = Sdn \cdot [R_1/\{\pi(2 \cdot d_{13} \cdot \tan \theta)^2\} + R_2/\{\pi(2 \cdot d_{23} \cdot \tan \theta)^2\}]/R_3 \quad (1\text{-}29)$$

In the case of considering the typical multilayered disc having the "N" layers ($2 \leq N$, N: an integer), the stray light from other layers amount $SSn_i$ in the i-th layer at the reference optical system is expressed by the following equation.

$$SSn_i = Sdn \cdot [\Sigma R_j/\{\pi(2 \cdot d_{ij} \cdot \tan \theta)^2\}]/R_i \quad (1\text{-}30)$$

($\Sigma$: addition of integers from 1 to N in a case of $j \neq i$, with regard to j)
($1 \leq i \leq N$, i: an integer)
($1 \leq j \leq N$, $i \neq j$, j: an integer)

Figure 5:
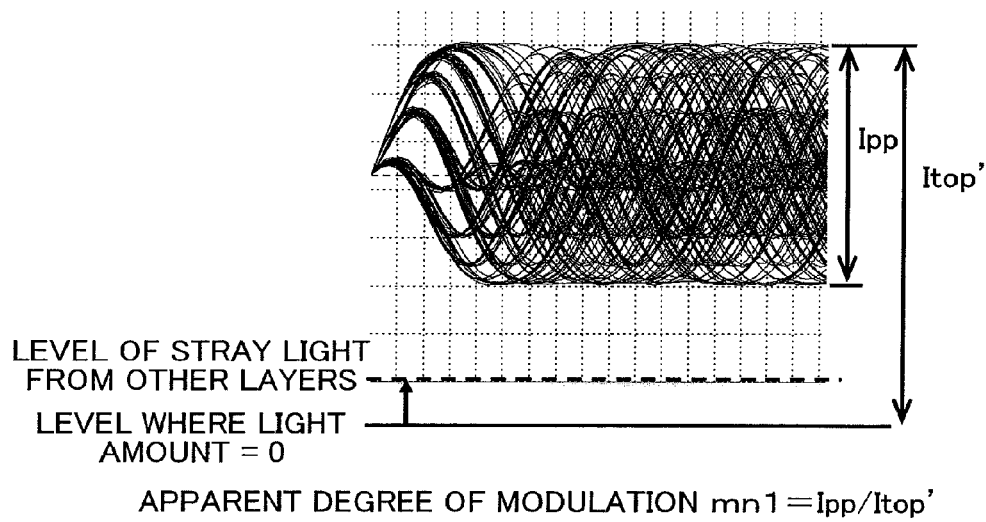
FIG. 5 is a waveform chart showing an example of a pattern of a reproduction signal converted into a modulation degree at a reference optical system, in accordance with the first embodiment of the present invention.
Figure 8A:
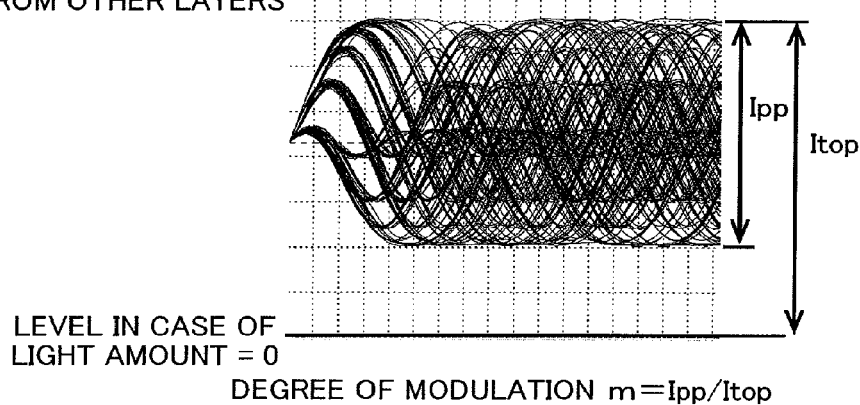
FIG. 8A is a waveform chart showing an example of a pattern of a reproduction signal without a stray light from other layers.
Figure 8B:
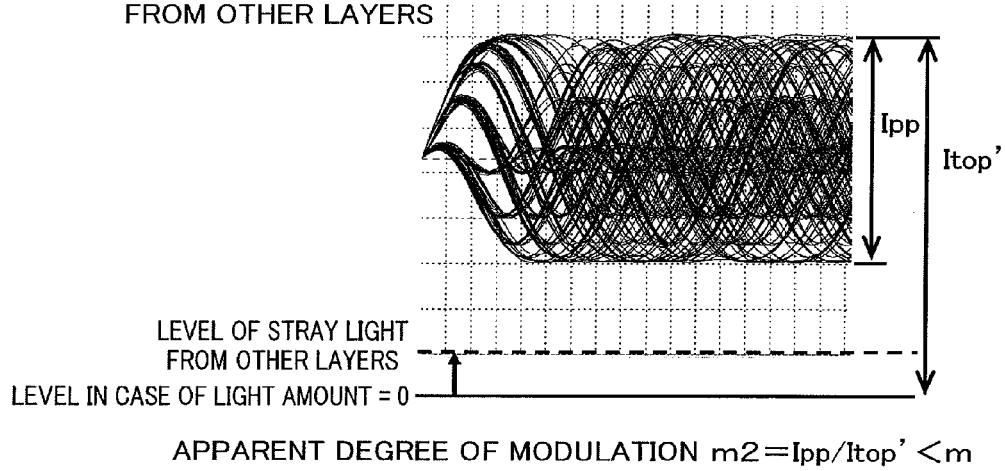
FIG. 8B is a waveform chart showing an example of a pattern of a reproduction signal with a stray light from other layers.

FIG. 5 shows an example of the reproduction signal of the first layer for the standard optical system. The apparent modulation degrees $md_i$ to $md_3$ measured by the measurement optical system and obtained based on the equations described above are converted into the modulation degrees $mn_i$ to $mn_3$ for the standard optical system, based on the following equation.

$$mn_1 = I_{pp}/I_{top}' = I_{pp}/I_{top} \cdot I_{top}/I_{top}' = md_1 \cdot I_{top}/I_{top}' \quad (1\text{-}31)$$

In this equation, for example, the modulation degree $md_1$ of the first layer for the measurement optical system is defined as $I_{pp}/I_{top}$ shown in FIG. 4, and the modulation degree $mn_1$ of the first layer for the standard optical system is defined as $I_{pp}/I_{top}'$ shown in FIG. 5. Thus, the value $I_{top}$ is expressed by the following equation, based on the value $SSn_1$ in the equation (1-23).

$$I_{top} \propto 1 + SS_1 \quad (1\text{-}32)$$

Moreover, the value $I_{top}'$ is expressed by the following equation, based on the value $SSn_1$ in the equation (1-27).

$$I_{top}' \propto 1 + SSn_1 \quad (1\text{-}33)$$

Therefore, the equation (1-31) can be modified into the following equation.

$$mn_1 = md_1 \cdot (1 + SS_1)/(1 + SSn_1) \quad (1\text{-}34)$$

Similarly, the modulation degree $mn_2$ of the second layer for the standard optical system is expressed by the following expression.

$$mn_2 = md_2 \cdot (1 + SS_2)/(1 + SSn_2) \quad (1\text{-}35)$$

Further, the modulation degree $mn_3$ of the third layer for the standard optical system is expressed by the following expression.

$$mn_3 = md_3 \cdot (1 + SS_3)/(1 + SSn_3) \quad (1\text{-}36)$$

In the case of considering the typical multilayered disc having the "N" layers ($2 \leq N$, N: an integer), the modulation degree $mn_i$, of the i-th layer ($1 \leq i \leq N$, i: an integer) for the standard optical system is expressed by the following equation.

$$mn_i = md_i \cdot (1 + SS_i)/(1 + SSn_i) \quad (1\text{-}37)$$

As described, S204 of obtaining the result of conversion as the modulation degree for the standard optical system can be realized by carrying out S204a of calculating the stray light amount from other layer $SS_i$ in the i-th layer for the measurement optical system, based on the equation (1-26) and calculating the stray light amount from other others $SSn_i$ in the i-th layer for the standard optical system, based on the equation (1-30), and S204b of obtaining the result of conversion as the modulation degree for the standard optical system, based on the equation (1-37) as shown in FIGS. 13 to 16.

As an alternative for S204, further, an approximate expression may be set up in consideration of the influence from only the adjacent layer, with regard to the stray light amount from other layers $SS_i$ in the i-th layer for the measurement optical system and the stray light amount from other layers $SSn_i$ in the i-th layer for the standard optical system.

In the case of considering the multilayered disc having the "N" layers ($2 \leq N$, N: an integer), it is assumed that the adjacent layers of the i-th layer ($1 \leq i \leq N$, i: an integer) are defined as the j-th layer (j=i−1) and the k-th layer (k=i+1). Thus, the stray light amount from other layers $SS_i$ in the i-th layer for the measurement optical system can be expressed by the following equation.

$$SS_i = Sd \cdot [R_j/\{\pi(2 \cdot d_{ij} \cdot \tan\theta)^2\} + R_k/\{\pi(2 \cdot d_{jk} \cdot \tan\theta)^2\}]/R_i \quad (1\text{-}26\text{-}2)$$

(in a case of i=1, $R_j/\{\pi(2 \cdot d_{ij} \cdot \tan\theta)^2\} = 0$
in a case of i=N, $R_k/\{\pi(2 \cdot d_{jk} \cdot \tan\theta)^2\} = 0$)

Moreover, the stray light amount from other layers $SSn_i$ in the i-th layer for the standard optical system can be expressed by the following equation.

$$SSn_i = Sdn \cdot [R_j/\{\pi(2 \cdot d_{ij} \cdot \tan\theta)^2\} + R_k/\{\pi(2 \cdot d_{jk} \cdot \tan\theta)^2\}]/R_i \quad (1\text{-}30\text{-}2)$$

(in a case of i=1, $R_j/\{\pi(2 \cdot d_{ij} \cdot \tan\theta)^2\} = 0$
in a case of i=N, $R_k/\{\pi(2 \cdot d_{jk} \cdot \tan\theta)^2\} = 0$)

The stray light amounts from other layers $SS_i$ and $SSn_i$ are calculated based on the equations (1-26-2) and (1-30-2), respectively, so that the modulation degree for the standard optical system can be obtained based on the equation (1-37). In this case, it becomes possible to significantly reduce the frequency of calculations and to obtain the degree of modulation for the standard optical system with ease.

As shown in FIG. 17, S204 of obtaining the result of conversion as the modulation degree for the standard optical system can be realized by carrying out S204c of calculating the stray light amount $SS_i$ for the measurement optical system and the stray light amount $SSn_i$ for the standard optical system (based on either the equations (1-26) and (1-30) or the equations (1-26-2) and (1-30-2)), and S204b of obtaining the result of conversion as the modulation degree for the standard optical system, based on the equation (1-37).

Herein, the reflectance (e.g., $R_1$ to $R_3$) of each layer is used for the conversion of the degree of modulation. However, the degree of modulation may be subjected to approximation using the measured value (e.g., $S_1$ to $S_3$) containing the stray light. This is because since only the reflectance ratio between the respective layers is used for the conversion of the degree of modulation, and the effects from the stray light is therefore limited. In this case, the reflectance of the layer having a small thickness with the adjacent layer may be approximated largely.

The foregoing descriptions concern the method for converting the degree of modulation for each layer, measured by the measurement optical system, into the degree of modulation of each layer for the standard optical system in accordance with the first embodiment of the present invention As described above, according to the foregoing method of the present embodiment, irrespectively of an optical system adopted for the measurement, it is possible to obtain the degree of modulation as measured provided that the object subjected to measurement is the same as if the modulation degree is measured by the standard optical system. Namely, according to the method of the present embodiment, for properties of various optical discs (optical recording medium), the same result of measurement as that obtained when measured by the standard optical system can be obtained. It is therefore possible to reduce variations in value indicative of a property of an optical disc among optical systems adopted for measurement, thereby realizing an improved compatibility of optical disc drives with the optical disc.

Second Embodiment

FIG. 7 shows a method for converting a difference in reflectance between the respective layers of the multilayered disc, as measured by the measurement optical system, into a difference in reflectance for the standard optical system in accordance with the second embodiment of the present invention. Herein, the difference in reflectance is calculated from a difference in the maximum level $I_{top}$ of the reproduction signal between the layers. It is assumed that the maximum level of the reproduction signal of the first layer is represented by $I_{top1}$ and the maximum level of the reproduction signal of the second layer is represented by $I_{top2}$. Thus, the difference in reflectance can be obtained based on the following equation.

$$\alpha = (I_{top1} - I_{top2})/(I_{top1} + I_{top2}) \quad (2\text{-}1)$$

However, the maximum level $I_{top}$ contains the component of the stray light from other layers, as in the case of the first embodiment. For this reason, the value indicative of the difference in reflectance α differs depending on an optical system adopted for the measurement. Hence, the value obtained from the measurement optical system needs to be converted into a value for the standard optical system. The converting method of difference in reflectance includes four steps S301, S202, S203 and S302. The respective steps are described below. (S301: Step of measuring ratio between reproduction signal and incident light amount in each layer)

In S301, a ratio between the reproduction signal and the incident light amount in each layer of the optical disc is measured. As in the first embodiment, herein, explanations will be given through the case of adopting a disc of a triple-layered structure. In the measurement optical system, the apparent reflectance $S_i$ corresponding to the ratio between the signal light amount and the incident light amount each of which can be measured when reproducing information from the i-th layer is expressed by the following equations as in the manner described in the first embodiment.

$$S_1 = R_1 + Sd \cdot [R_2/\{\pi(2 \cdot d_{12} \cdot \tan\theta)^2\} + R_3/\{\pi(2 \cdot d_{13} \cdot \tan\theta)^2\}] \quad (2\text{-}2)$$

$$S_2 = R_2 + Sd \cdot [R_1/\{\pi(2 \cdot d_{12} \cdot \tan\theta)^2\} + R_3/\{\pi(2 \cdot d_{23} \cdot \tan\theta)^2\}] \quad (2\text{-}3)$$

$$S_3 = R_3 + Sd \cdot [R_1/\{\pi(2 \cdot d_{13} \cdot \tan\theta)^2\} + R_2/\{\pi(2 \cdot d_{23} \cdot \tan\theta)^2\}] \quad (2\text{-}4)$$

The ratio ($S_1$ to $S_3$) between the signal light amount and the incident light amount in each layer can be measured by the measurement optical system.

(S202: Step of Obtaining Thickness Between Respective Layers)

Figure 18:
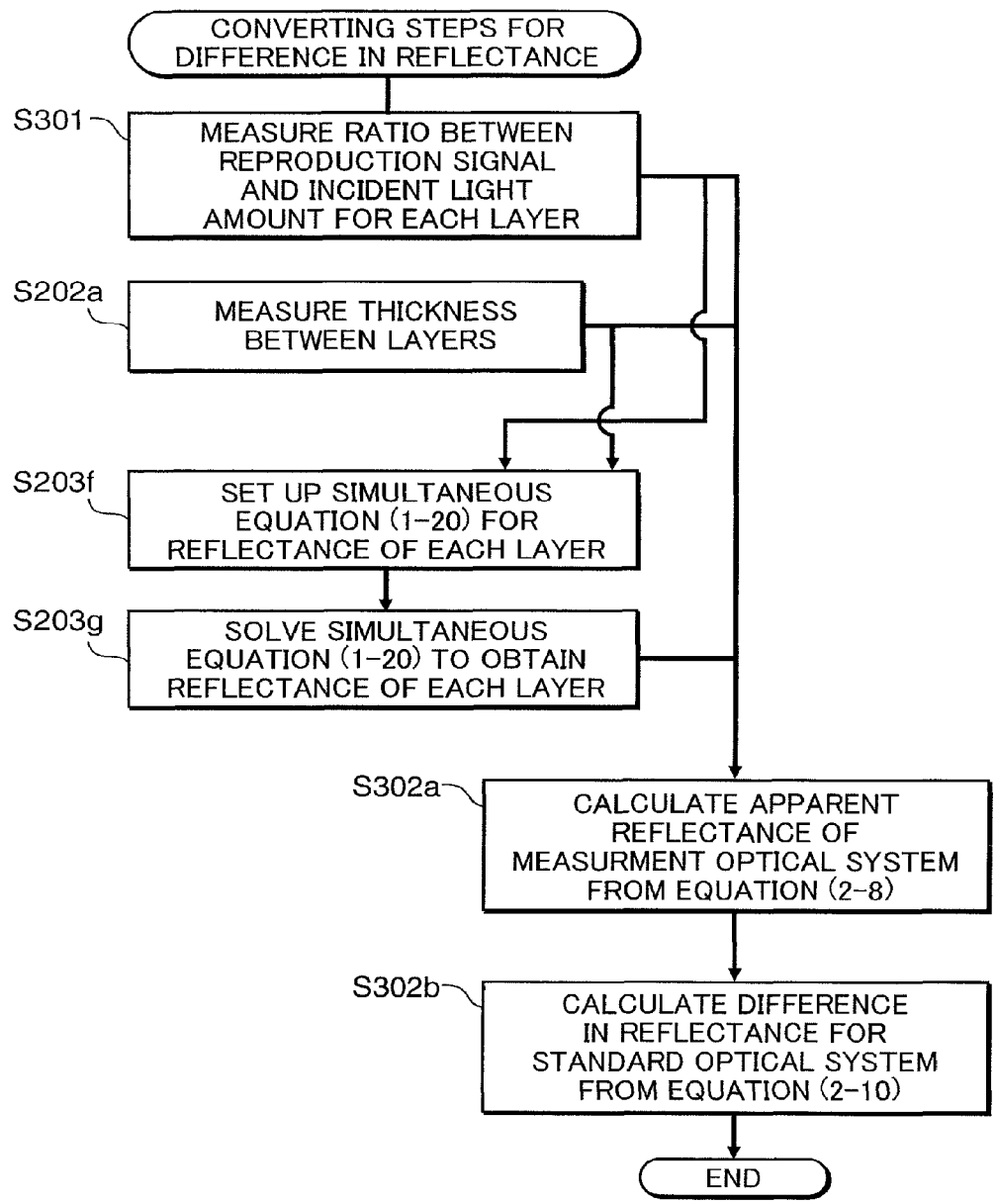
FIG. 18 is a conceptual diagram showing one example of a calculation method for a difference in reflectance in accordance with the second embodiment of the present invention.

Here, as in the case of the first embodiment, a thickness between layers of the optical disc may be measured actually (S202a in FIG. 18). Moreover, the value indicative of the thickness between the layers may be a design value (a target thickness when manufacturing an optical disc) or an average value of variations upon mass-production of the optical disc (an average thickness in a case of manufacture of a plurality of optical information media). Alternatively, the value indicative of the thickness between layers may be a standard value specified in accordance with specifications and the like.

(S203: Step of Obtaining Reflectance of each Layer)

The reflectances $R_1$ to $R_3$ of the respective layers can be obtained in such a manner that the three equations described above (i.e., the equations (2-2) to (2-4)) are solved with regard to the reflectances $R_1$ to $R_3$.

Herein, each of the apparent reflectances $S_1$ to $S_3$ takes the value obtained in S301 (the step of measuring the ratio between the reproduction signal and the incident light amount in each layer). Each of the numerical aperture NA and the normalize light receiving part size Sd is already known and is determined based on the measurement optical system. The refractive index n can be obtained separately as the parameter of the optical disc. The value θ satisfies the condition of sin θ=NA/n. Each of the distance $d_{12}$ between the first and second layers of the optical disc, and the like takes the value obtained in S202 (the step of obtaining the thickness between layers).

Figure 19:
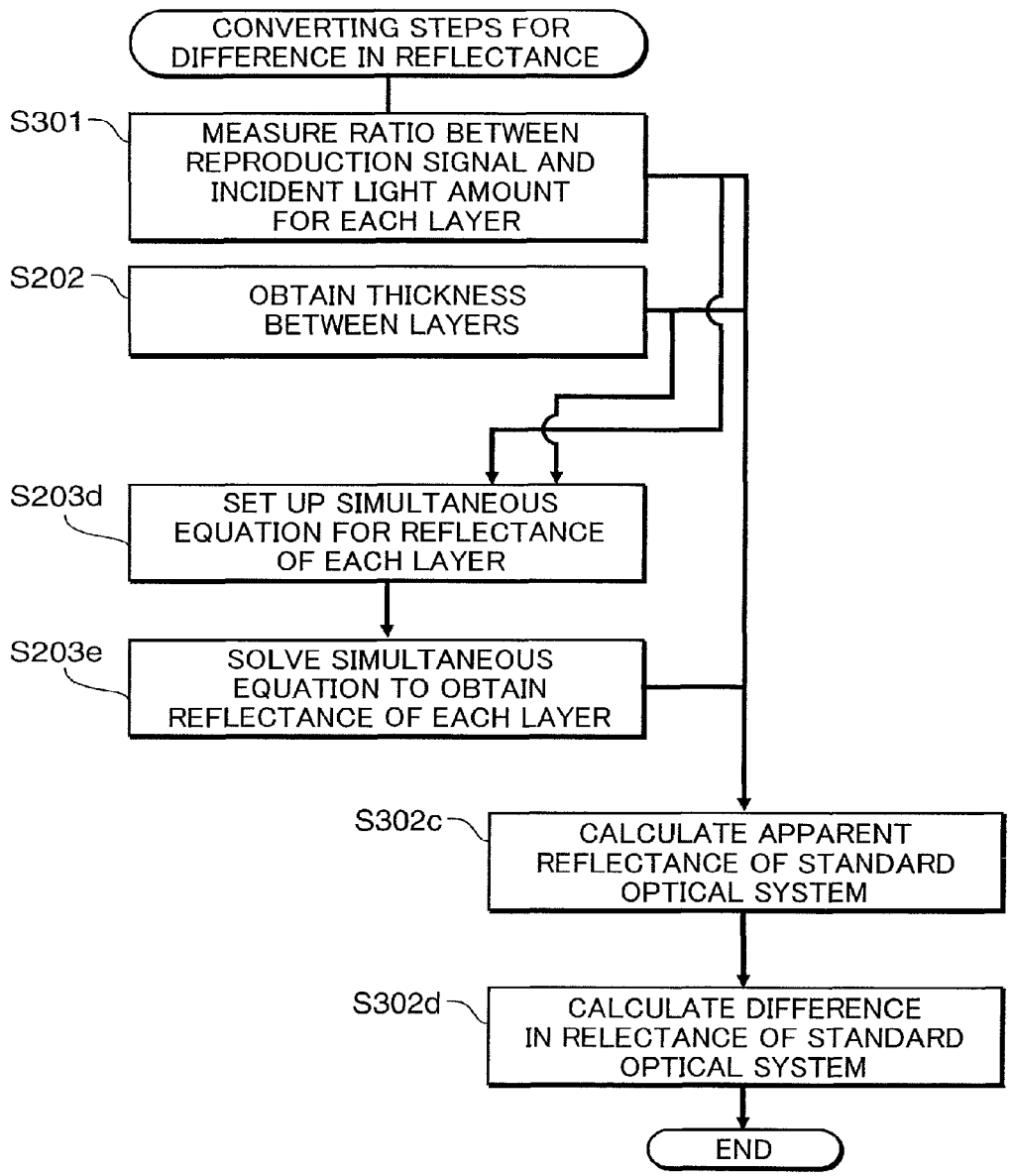
FIG. 19 is a conceptual diagram showing another example of calculation method for a difference in reflectance in accordance with the second embodiment of the present invention.

S203 can be realized by carrying out S203$f$ of establishing the simultaneous equation (the equation (1-20)) with regard to the reflectance $R_i$ of each layer, and S203$g$ of solving the simultaneous equation to obtain the reflectance $R_i$ of each layer as shown in FIG. 18. As shown in FIG. 19, further, S203 may be realized by carrying out S203$d$ and S203$e$.

(S302: Step of Calculating Difference in Reflectance at Reference Optical System)

An apparent reflectance $Sn_i$ corresponding to a ratio between a signal light amount and an incident light amount each of which can be measured when reproducing information from the i-th layer for the standard optical system is calculated based on the following equations using the reflectances $R_1$ to $R_3$ obtained in S203 (the step of obtaining the reflectance of each layer).

$$Sn_1 = R_1 + Sdn \cdot [R_2/\{\pi(2 \cdot d_{12} \cdot \tan \theta)^2\} + R_3/\{\pi(2 \cdot d_{13} \cdot \tan \theta)^2\}] \quad (2-5)$$

$$Sn_2 = R_2 + Sdn \cdot [R_1/\{\pi(2 \cdot d_{12} \cdot \tan \theta)^2\} + R_3/\{\pi(2 \cdot d_{23} \cdot \tan \theta)^2\}] \quad (2-6)$$

$$Sn_3 = R_3 + Sdn \cdot [R_1/\{\pi(2 \cdot d_{13} \cdot \tan \theta)^2\} + R_2/\{\pi(2 \cdot d_{23} \cdot \tan \theta)^2\}] \quad (2-7)$$

In the case of considering the typical multilayered disc having the "N" layers (2≦N, N: an integer), the apparent reflectance $Sn_i$, is expressed by the following equation.

$$Sn_i = R_i + Sdn \cdot [\Sigma R_j/\{\pi(2 \cdot d_{ij} \cdot \tan \theta)^2\}] \quad (2-8)$$

(Σ: addition of integers from 1 to N in a case of j≠i, with regard to j)
(1≦i≦N, i: an integer)
(1≦j≦N, i≠j, j: an integer)

As in the equation (2-1), for example, the difference in reflectance between the first layer and the second layer is given based on the following equation using the apparent reflectance $Sn_i$ for the standard optical system.

$$\alpha n_{12} = (Sn_1 - Sn_2)/(Sn_1 + Sn_2) \quad (2-9)$$

In the case of considering the typical multilayered disc having the "N" layers (2≦N, N: an integer), the difference in reflectance $\alpha n_{ij}$ between the i-th layer and the j-th layer is obtained based on the following equation.

$$\alpha n_{ij} = (Sn_i - Sn_j)/(Sn_i + Sn_j) \quad (2-10)$$

(1≦i≦N, i: an integer) (1≦j≦N, i≠j, j: an integer)

Thus, it becomes possible to obtain a difference in reflectance between arbitrary layers for the standard optical system.

As described, S302 of calculating the difference in reflectance for the standard optical system can be realized by carrying out S302$a$ of calculating the apparent reflectance $Sn_i$ for the standard optical system, based on the equation (2-8), and S302$b$ of calculating the difference in reflectance $\alpha n_{ij}$ for the standard optical system, based on the equation (2-10) as shown in FIG. 18.

This embodiment takes the stray light from all the layers into consideration in order to obtain the reflectance $R_i$ of each layer. However, this embodiment may take the stray light from only the adjacent layer into consideration, as in the first embodiment. In this case, although an error is increased, the number of items to be calculated is reduced. Thus, it becomes possible to more readily obtain the value.

Moreover, this embodiment takes the stray light from all the layers into consideration in order to obtain the ratio $Sn_i$, between the signal light amount and the incident light amount each of which can be measured when reproducing information from the i-th layer in the reference optical system. Also in this case, this embodiment may take the stray light from only the adjacent layer into consideration.

More specifically, in the multilayered disc having the "N" layers (2≦N, N: an integer), in the case where the i-th layer (1≦i≦N, i: an integer) is located between the j-th layer (j=i−1) and the k-th layer (k=i+1), the ratio $Sn_i$ is expressed by the following general equation.

$$Sn_i = R_i + Sdn \cdot [R_j/\{\pi(2 \cdot d_{ij} \cdot \tan \theta)^2\} + R_k/\{\pi(2 \cdot d_{ik} \cdot \tan \theta)^2\}] \quad (2-11)$$

(in a case of i=1, $R_j/\{\pi(2 \cdot d_{ij} \cdot \tan \theta)^2\} = 0$
in a case of i=N, $R_k/\{\pi(2 \cdot d_{ik} \cdot \tan \theta)^2\} = 0$)

Also in this case, although an error is increased, the number of items to be calculated can be reduced. Thus, it becomes possible to more readily obtain the value.

As an alternative approximation, description will be given of an example that employs, in place of the reflectance $R_i$, the apparent reflectance $S_i$ corresponding to the amount obtained by standardizing, with the incident light amount, the light amount in the reproduction signal (containing the stray light) which can be measured by the measurement optical system when reproducing information from the i-th layer of the optical disc.

In this case, the apparent reflectance $Sn_i$ for the standard optical system is expressed by the following general equation.

$$Sn_i = S_i + Sdn \cdot [\Sigma S_j/\{\pi(2 \cdot d_{ij} \cdot \tan \theta)^2\}] \quad (2-12)$$

(Σ: addition of integers from 1 to N in a case of j≠i, with regard to j)

Herein, the reflectance $S_i$ which takes the measured value is set as the reflectance of each layer (S203$h$ in FIG. 20); therefore, it is unnecessary to solve the equation with regard to the reflectance $R_i$. Thus, it becomes possible to quite readily conduct the calculation.

In the case of employing the apparent reflectance $S_i$ in place of the reflectance $R_i$, the apparent reflectance $Sn_i$ may be calculated in consideration of the influence from only the adjacent layer.

In the multilayered disc having the "N" layers (2≦N, N: an integer), it is assumed that the i-th layer (1≦i≦N, i: an integer) is located between the j-th layer (j=i−1) and the k-th layer (k=i+1). Thus, the apparent reflectance $Sn_i$ is expressed by the following general equation.

$$Sn_i = R_i + Sdn \cdot [S_j/\{\pi(2 \cdot d_{ij} \cdot \tan \theta)^2\} + S_k/\{\pi(2 \cdot d_{ik} \cdot \tan \theta)^2\}] \quad (2-13)$$

(in a case of i=1, $R_j/\{\pi(2 \cdot d_{ij} \cdot \tan \theta)^2\} = 0$
in a case of i=N, $R_k/\{\pi(2 \cdot d_{ik} \cdot \tan \theta)^2\} = 0$)

In this case, it becomes possible to further reduce the number of items to be calculated.

Figure 20:
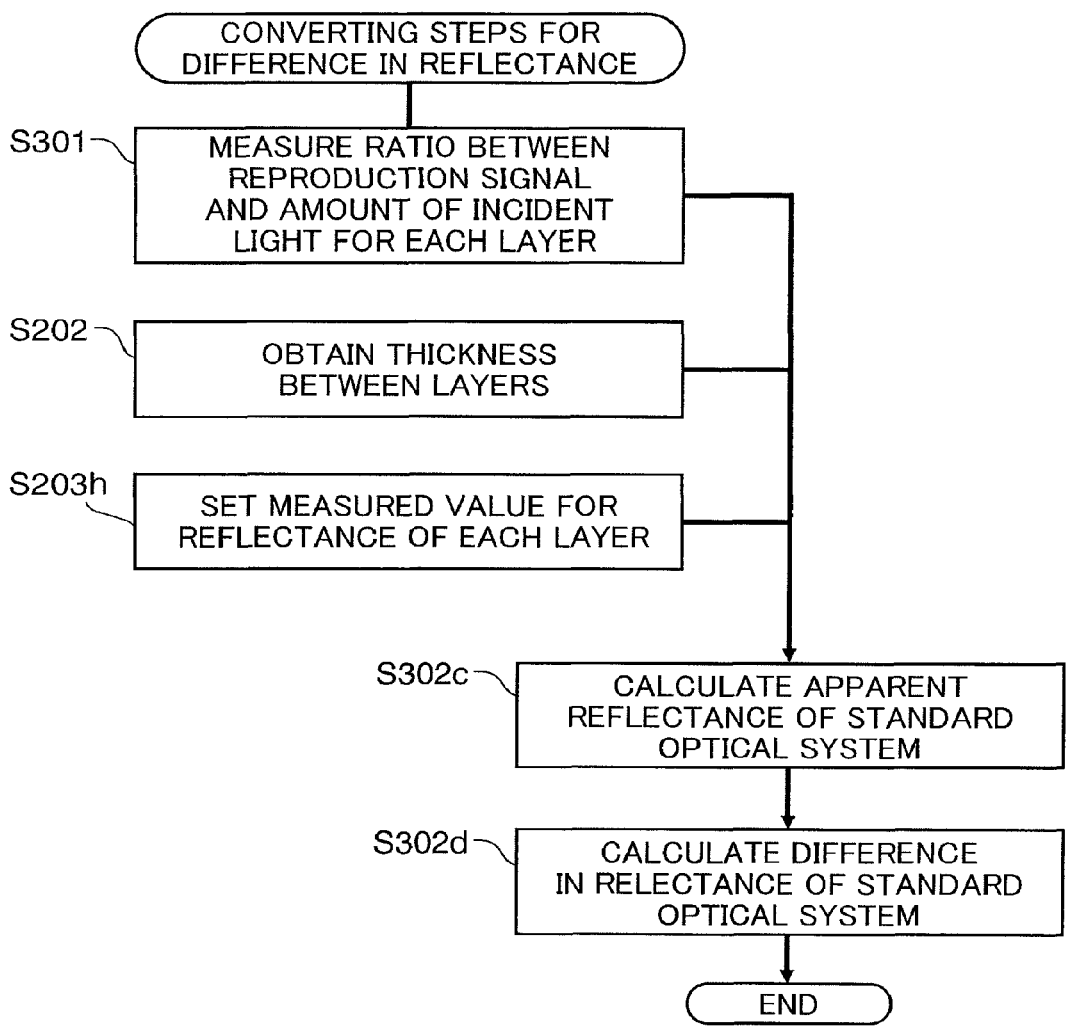
FIG. 20 is a conceptual diagram showing still another example of a calculating method for a difference in reflectance in accordance with the second embodiment of the present invention.
Figure 21:
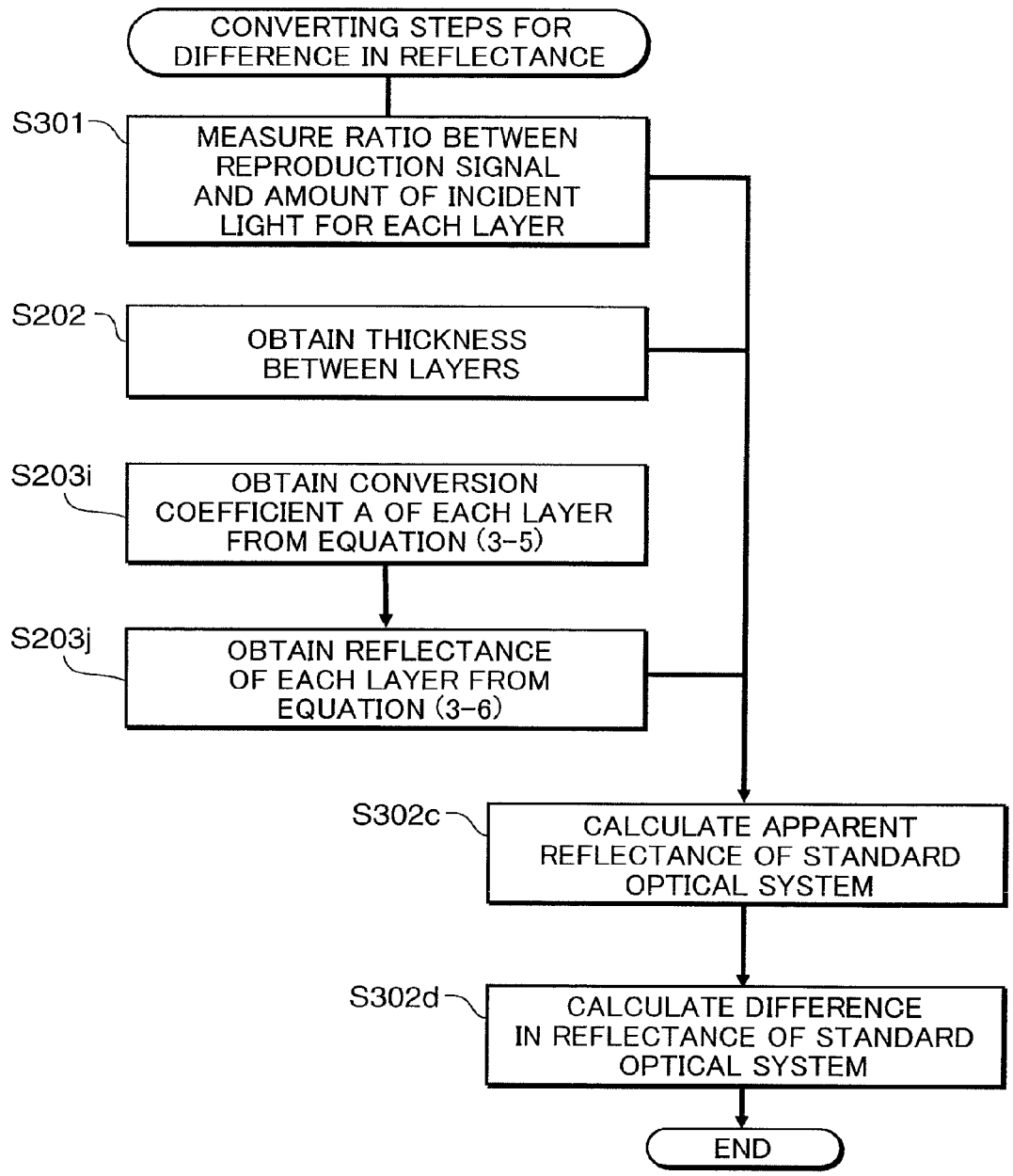
FIG. 21 is a conceptual diagram showing one example of a difference in reflectance calculating method in accordance with the third embodiment of the present invention.

As described, S302 of calculating the difference in reflectance for the standard optical system can be realized by carrying out S302c of calculating the apparent reflectance $Sn_i$ for the standard optical system, based on any one of the expressions described above, and S302d of calculating the difference in reflectance $\alpha n_{ij}$ for the standard optical system from the apparent reflectance $Sn_i$ as shown in FIGS. 19 to 21.

The foregoing description concerns the method for converting the difference in reflectance between the respective layers, measured by the measurement optical system, into the difference in reflectance between the respective layers for the standard optical system in accordance with the second embodiment of the present invention.

As described above, according to the foregoing method of the present embodiment, irrespectively of an optical system adopted for the measurement, it is possible to obtain the reflectance as measured provided that the object subjected to measurement is the same as if the reflectance is measured by the standard optical system. Namely, according to the method of the present embodiment, for properties of various optical discs (optical recording medium), the same result of measurement as that obtained when measured by the standard optical system can be obtained. It is therefore possible to reduce variations in value indicative of a property of an optical disc among optical systems adopted for measurement, thereby realizing an improved compatibility of optical disc drives with the optical disc.

Third Embodiment

The following descriptions will explain a method of obtaining a reflectance of each layer in accordance with the third embodiment of the present invention as an alternative method of S203 of those adopted in the first and second embodiments of the present invention.

In the case of considering the measured values $S_1$ to $S_3$ of the reflectances of the respective layers, each containing the stray light, this embodiment involves obtaining a conversion coefficient by calculation of an amount of the stray light contained in the measured value of each layer when a reflectance ratio between the respective layers takes a value of 1, and approximating, as the reflectance of each layer, a value obtained by dividing the reflectance measured actually by the conversion coefficient. This case neglects a point that the actual stray light content incurs an influence due to the reflectance ratio. However, this influence can be eliminated by approximation of a standard stray light amount.

Herein, the triple-layered disc is described as an example. It is assumed that the reflectance of the first layer is represented by $R_1$, the reflectance of the second layer is represented by $R_2$, and the reflectance of the third layer is represented by $R_3$. Moreover, it is assumed that the distance between the first and second layers is represented by $d_{12}$, the distance between the first and third layers is represented by $d_{13}$, the distance between the second and third layers is represented by $d_{23}$, the refractive index of the intermediate layer is represented by n, and the numerical aperture of the optical system is represented by NA. Further, it is assumed that the relation of $\sin\theta = NA/n$ is satisfied, and the normalize light receiving part size of the detecting system of the measurement optical system is represented by Sd.

Here, it is assumed that the amount obtained by standardizing, with the incident light amount, the signal which can be measured when reproducing information from the i-th layer is represented by $S_i$, and the respective layers have the same reflectance, that is, the following condition holds.

$$R_1 = R_2 = R_3 = R \quad (3\text{-}1)$$

Then, the conversion coefficient $a_i$ of each layer is expressed by the following equations.

$$a_1 = S_1/R = 1 + Sd \cdot [1/\{\pi(2d_{12}\cdot\tan\theta)^2\} + 1/\{\pi(2\cdot d_{13}\cdot\tan\theta)^2\}] \quad (3\text{-}2)$$

$$a_2 = S_2/R = 1 + Sd \cdot [1/\{\pi(2d_{12}\cdot\tan\theta)^2\} + 1/\{\pi(2\cdot d_{23}\cdot\tan\theta)^2\}] \quad (3\text{-}3)$$

$$a_3 = S_3/R = 1 + Sd \cdot [1/\{\pi(2d_{13}\cdot\tan\theta)^2\} + 1/\{\pi(2\cdot d_{23}\cdot\tan\theta)^2\}] \quad (3\text{-}4)$$

In the case of considering the typical multilayered disc having the "N" layers ($2 \leq N$, N: an integer), a conversion coefficient $a_i$, of the i-th layer is expressed by the following equation.

$$a_i = S_i/R = 1 + Sd \cdot [\Sigma 1/\{\pi(2d_{ij}\cdot\tan\theta)^2\}] \quad (3\text{-}5)$$

($\Sigma$: addition of integers from 1 to N in a case of $j \neq i$, with regard to j)
($1 \leq i \leq N$, i: an integer)
($1 \leq j \leq N$, $i \neq j$, j: an integer)

From this conversion coefficient $a_i$, the reflectance $R_i$ of each layer is obtained based on the following equation.

$$R_i = S_i/a_i \quad (3\text{-}6)$$

As shown in FIG. 21, accordingly, S203, i.e., the step of obtaining the reflectance of each layer can be realized by carrying out S203i of obtaining the conversion coefficient $a_i$ of each layer of the optical disc, based on the equation (3-5), and S203j of obtaining the reflectance $R_i$ of each layer, based on the equation (3-6).

As a concrete example, it is assumed that the numerical aperture NA is 0.85, the refractive index n is 1.60, the distance $d_{12}$ between the first and second layers of the triple-layered disc is 25 μm, and the distance $d_{23}$ between the second and third layers is 15 μm. Moreover, it is assumed that the light receiving part of the detector has the square size of 120 μm×120 μm, and the magnification M of the detecting system is 20. In this case, the normalize light receiving part size Sd of the measurement optical system is 36 μm², and the relations of $\sin\theta = NA/n = 0.531$, $\theta = 32.09°$, and $\tan\theta = 0.627$ are satisfied. Accordingly, the conversion coefficient $a_i$ of each layer is expressed by the following equation.

$$a_1 = S_1/R = 1.0162$$

$$a_2 = S_2/R = 1.0440 \quad (3\text{-}7)$$

$$a_3 = S_3/R = 1.0369$$

From these numeric values, the reflectance $R_i$ of each layer can be obtained based on the following equation.

$$R_1 = S_1/1.0162$$

$$R_2 = S_2/1.044 \quad (3\text{-}8)$$

$$R_3 = S_3/1.0369$$

This embodiment is equal to the first and second embodiments in a method of obtaining a modulation degree and a method of obtaining a difference in reflectance.

According to the method of the present embodiment, it is possible to calculate a reflectance without influence from stray light in simpler manner.

As described above, even when a reflectance is measured by any optical system, the method according to this embodiment allows calculation of a reflectance of a medium without influence from stray light. Thus, this method brings about a result which is equal to a result obtained when properties of various optical discs (optical information media) are measured by a predetermined optical system. It is therefore possible to reduce variations in value indicative of a property of an optical disc among optical systems adopted for measurement, thereby realizing an improved compatibility of optical disc drives with the optical disc.

Figure 10:
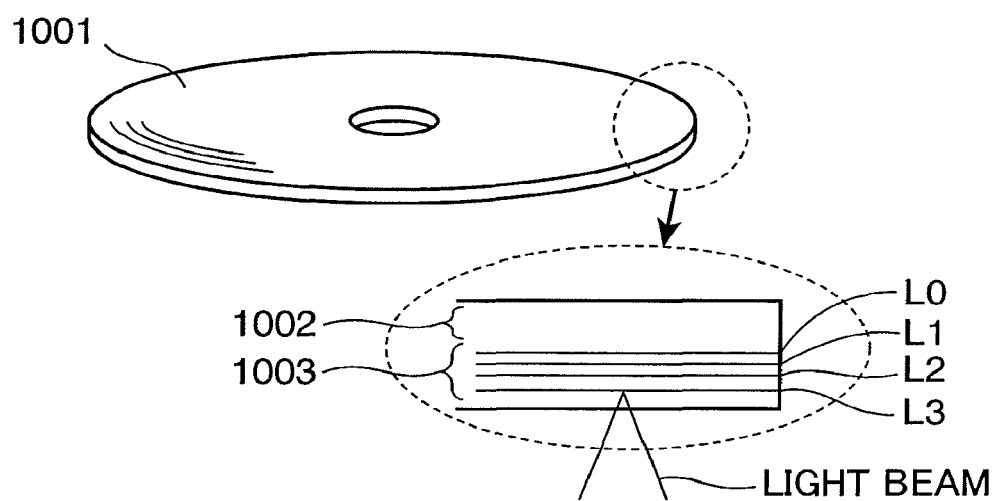
FIG. 10 is an explanatory diagram showing an optical information medium in accordance with one embodiment of the present invention.

Next, descriptions will be given of an optical information medium subjected to measurement by the optical information medium measurement method according to each of the first to third embodiments. FIG. 10 shows a schematic configuration of a multilayered disc 1001 (an optical information medium) having four information layers. The multilayered disc 1001 includes a disc substrate 1002, and an information layer 1003 formed on the disc substrate 1002. The information layer 1003 includes a recording layer L0, a recording layer L1, a recording layer L2 and a recording layer L3 that are formed in a sequence so as to be distant from a side irradiated with a light beam for use in reproduction or recording (i.e., from a side of the substrate 1002).

Next, brief description will be given of a method for manufacturing the multilayered disc 1001. First, there is prepared the disc substrate 1002 having a surface provided with a track for recording an information signal thereon in accordance with an address signal and control data. Next, the information layer 1003 is formed on the disc substrate 1002. In other words, the recording layer L0, the recording layer L1, the recording layer L2 and the recording layer L3 are formed in this sequence on the disc substrate 1002. Herein, an intermediate layer or the like may be interposed between the respective recording layers. Moreover, a cover layer may be formed on the information layer 1003.

The foregoing descriptions have been given through the case of adopting the optical disc of a quadrilayered structure having fourth information layers for the multilayered disc 1001; however, the present invention is not limited to this example. Alternatively, an optical information medium to be used herein may include a plurality of information layers.

Figure 11:
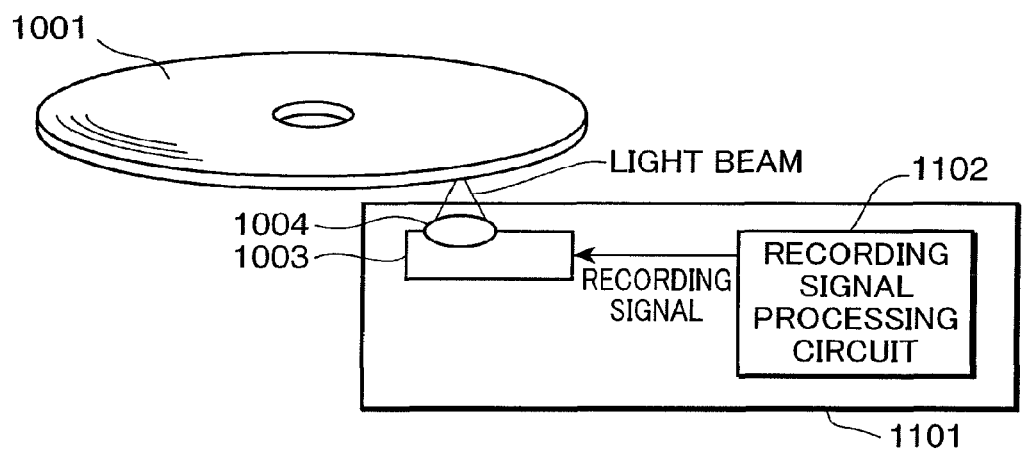
FIG. 11 is an explanatory diagram showing a recording apparatus in accordance with one embodiment of the present invention.

FIG. 11 shows a schematic structure of an information recording apparatus (a recording apparatus) 1101 that records information on the optical information medium described above. The information recording apparatus 1101 includes a recording signal processing circuit 1102, an optical head 1103, an objective lens 1104, and the like. The recording signal processing circuit 1102 generates a recording signal in accordance with record data. The optical head 1103 irradiates the recording surface of the multilayered disc 1001 with a light beam to write information in the recording surface in accordance with the recording signal. The light beam is collected by the objective lens 1104 and is then converged onto the specific recording layer of the information layer 1003 of the multilayered disc 1001.

Figure 12:
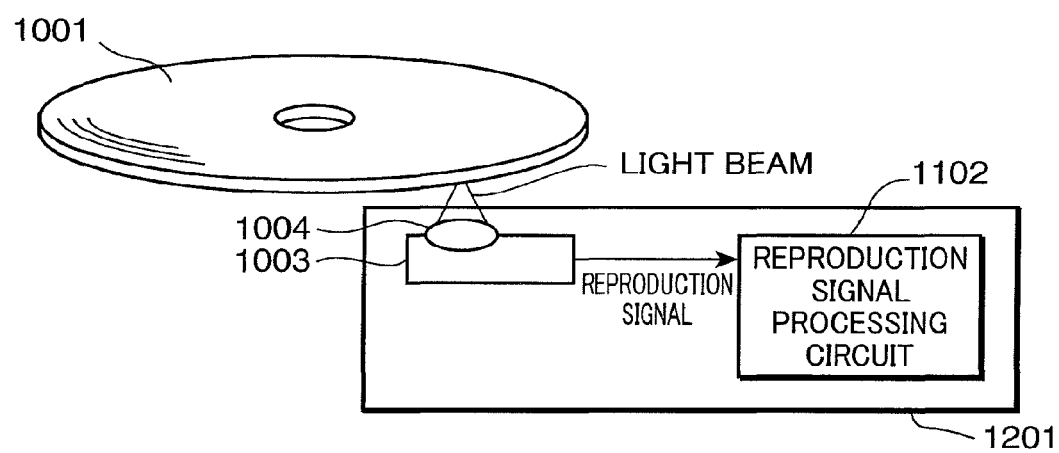
FIG. 12 is an explanatory diagram showing a reproducing apparatus in accordance with one embodiment of the present invention.

FIG. 12 shows a schematic configuration of an information reproducing apparatus 1201 (a reproducing apparatus) that reproduces information from the optical information medium described above. The information reproducing apparatus 1201 includes a reproduction signal processing circuit 1202, an optical head 1103 and an objective lens 1104. The optical head 1103 irradiates the recording surface of the multilayered disc 1001 with a light beam, and then detects light reflected from the recording surface of the multilayered disc 1001 to read information. The light beam is collected by the objective lens 1104 and is then converged onto the specific recording layer of the information layer 1003 of the multilayered disc 1001. The reproduction signal processing circuit 1202 receives a reproduction signal obtained by electrical detection of the light reflected from the recording surface of the multilayered disc 1001, separates and demodulates a signal component recorded on the multilayered disc 1001, and reproduces required information.

An optical information medium measurement method according to one aspect of the present invention, for measuring a degree of modulation in an optical information medium of a multilayered structure having a plurality of information layers includes: a first step of measuring the modulation degree of each layer of the optical information medium, by a measurement optical system, a second step of obtaining a thickness between layers of the optical information medium, a third step of obtaining a reflectance of each layer of the optical information medium, and a fourth step of converting the modulation degree of each layer, the modulation degree being measured in the first step, into a modulation degree at a reference optical system differing from the measurement optical system, based on a value indicative of the thickness between layers, the thickness being obtained in the second step, and a value indicative of the reflectance of each layer, the reflectance being obtained in the third step.

With this structure, it is possible to convert, into the modulation degree at the unified standard optical system, the modulation degree in the optical information medium, the modulation degree being measured by any measurement optical system differing from the standard optical system. Therefore, this configuration allows correct comparison of the modulation degree even when the optical information medium is subjected to measurement using any measurement optical system, without preparation of a special measurement optical system. Moreover, this configuration has the following effect. That is, it is possible to ensure compatibility of different apparatuses with the optical information medium in such a manner that the optical information medium is subjected to evaluation using the measured value converted into the degree of modulation for the standard optical system.

Preferably, the optical information medium is a multilayered disc having "N" layers ($2 \leq N$, N: an integer), and when it is assumed that the modulation degree of the i-th layer ($1 \leq i \leq N$, i: an integer), the modulation degree being measured in the first step, is represented by $md_i$, a stray light amount from other layers in the i-th layer for the measurement optical system is represented by $SS_i$, and a stray light amount from other layers in the i-th layer at the standard optical system is represented by $SSn_i$, then, in the fourth step, the modulation degree $mn_i$, of the i-th layer at the standard optical system is expressed by an equation of $$mn_i = md_i \cdot (1+SS_i)/(1+SSn_i).$$

With this structure, it is possible to readily and correctly obtain the result of conversion as the modulation degree $mn_i$ at the standard optical system, from the stray light amount from other layers $SS_i$ for the measurement optical system and the stray light amount from other layers $SSn_i$ at the standard optical system.

Preferably, when it is assumed that an area of a light receiving part in the measurement optical system is represented by $S_{pd}$, a magnification of a detecting system in the measurement optical system is represented by M, a normalize light receiving part size in the measurement optical system is represented by Sd ($Sd = S_{pd}/M^2$), a numerical aperture in the measurement optical system is represented by NA, the thickness between the i-th layer and the i-th layer ($1 \leq j \leq N$, $i \neq j$, j: an integer), the thickness being obtained in the second step, is represented by $d_{ij}$, a refractive index between the i-th layer and the i-th layer is represented by n, the reflectance of the i-th layer, the reflectance being obtained in the third step, is represented by $R_i$, and a value θ satisfies a relation of sin θ=NA/n and falls within a range from 0 to π/2, then, the stray light amount from other layers $SS_i$ in the i-th layer for the measurement optical system is expressed by an equation of $$SS_i = Sd \cdot [\Sigma R_j / \{\pi (2 \cdot d_{ij} \cdot \tan \theta)^2\}] / R_i$$

(Σ: addition of integers from 1 to N in a case of j≠i, with regard to j).

With this structure, it is possible to readily and correctly obtain the stray light amount from other layers $SS_i$ for the measurement optical system, based on the expression described above.

Preferably, when it is assumed that an area of a light receiving part in the standard optical system is represented by $Sn_{pd}$, a magnification of a detecting system in the standard optical system is represented by Mn, a normalize light receiving part size in the standard optical system is represented by Sdn ($Sdn = Sn_{pd}/Mn^2$), a numerical aperture in the measurement optical system is represented by NA, the thickness between the i-th layer and the j-th layer ($1 \leq j \leq N$, i≠j, j: an integer), the thickness being obtained in the second step, is represented by $d_{ij}$, a refractive index between the i-th layer and the j-th layer is represented by n, the reflectance of the i-th layer, the reflectance being obtained in the third step, is represented by $R_i$, and a value θ satisfies a relation of sin θ=NA/n and falls within a range from 0 to π/2, then, the stray light amount from other layers $SSn_i$ in the i-th layer at the standard optical system is expressed by an equation of $$SSn_i = Sdn \cdot [\Sigma R_j / \{\pi (2 \cdot d_{ij} \cdot \tan \theta)^2\}] / R_i$$

(Σ: addition of integers from 1 to N in a case of j≠i, with regard to j).

With this structure, it is possible to readily and correctly obtain the stray light amount from other layers $SSn_i$ at the standard optical system, based on the expression described above.

Preferably, when it is assumed that an area of a light receiving part in the measurement optical system is represented by $S_{pd}$, a magnification of a detecting system in the measurement optical system is represented by M, a normalize light receiving part size in the measurement optical system is represented by Sd ($Sd = S_{pd}/M^2$), a numerical aperture in the measurement optical system is represented by NA, the i-th layer ($1 \leq i \leq N$, i: an integer) is located between the j-th layer (j=i−1) and the k-th layer (k=i+1), the thickness between the i-th layer and the j-th layer, the thickness being obtained in the second step, is represented by $d_{ij}$, the thickness between the i-th layer and the k-th layer, the thickness being obtained in the second step, is represented by $d_{ik}$, a refractive index between the respective layers is represented by n, the reflectance of the i-th layer, the reflectance being obtained in the third step, is represented by $R_i$, and a value θ satisfies a relation of sin θ=NA/n and falls within a range from 0 to π/2, then, the stray light amount from other layers $SS_i$ in the i-th layer for the measurement optical system is expressed by an equation of $$SS_i = Sd \cdot [R_j / \{\pi (2 \cdot d_{ij} \cdot \tan \theta)^2\} / R_k / \{\pi (2 \cdot d_{ik} \cdot \tan \theta)^2\}] / R_i$$

(in a case of i=1, $R_j / \{\pi (2 \cdot d_{ij} \cdot \tan \theta)^2\} = 0$, in a case of i=N, $R_k / \{\pi (2 \cdot d_{ik} \cdot \tan \theta)^2\} = 0$).

With this structure, it is possible to significantly reduce a frequency of calculations and to more easily obtain the stray light amount from other layers $SS_i$ for the measurement optical system, based on the expression described above, in such a manner that the influence due to the stray light from other layers to be exerted herein is restricted to that from only the adjacent layer.

Preferably, when it is assumed that an area of a light receiving part in the standard optical system is represented by $Sn_{pd}$, a magnification of a detecting system in the standard optical system is represented by Mn, a normalize light receiving part size in the standard optical system is represented by Sdn ($Sdn = Sn_{pd}/Mn^2$), a numerical aperture in the measurement optical system is represented by NA, the i-th layer ($1 \leq i \leq N$, i: an integer) is located between the j-th layer (j=i−1) and the k-th layer (k=i+1), the thickness between the i-th layer and the j-th layer, the thickness being obtained in the second step, is represented by $d_{ij}$, the thickness between the i-th layer and the k-th layer, the thickness being obtained in the second step, is represented by $d_{ik}$, a refractive index between the respective layers is represented by n, the reflectance of the i-th layer, the reflectance being obtained in the third step, is represented by $R_i$, and a value θ satisfies a relation of sin θ=NA/n and falls within a range from 0 to π/2, then, the stray light amount from other layers $SSn_i$ in the i-th layer at the standard optical system is expressed by an equation of $$SSn_i = Sdn \cdot [R_j / \{\pi (2 \cdot d_{ij} \cdot \tan \theta)^2\} / R_k / \{\pi (2 \cdot d_{ik} \cdot \tan \theta)^2\}] / R_i$$

(in a case of i=1, $R_j / \{\pi (2 \cdot d_{ij} \cdot \tan \theta)^2\} = 0$, in a case of i=N, $R_k / \{\pi (2 \cdot d_{ik} \cdot \tan \theta)^2\} = 0$).

With this structure, it is possible to significantly reduce a frequency of calculations and to more readily acquire the stray light amount from other layers $SSn_i$ at the standard optical system, based on the expression described above, in such a manner that the influence due to the stray light from other layers to be exerted herein is restricted to that from only the adjacent layer.

In the second step, the thickness between layers of the optical information medium may be measured by a measuring machine.

With this structure, the thickness between layers is actually measured in the second So that the more accurate value indicative of the reflectance of each layer can be obtained in the third step. Accordingly, it is possible to achieve more correct conversion into the modulation degree $mn_i$, for the standard optical system.

Preferably, in the second step, the thickness between layers of the optical information medium takes a design value upon manufacture of the optical information medium.

With this structure, it is possible to omit the process of measuring the distance between the respective layers of the optical information medium, and to readily obtain the value indicative of the thickness between layers.

Preferably, in the second step, the thickness between layers of the optical information medium takes an average value upon manufacture of the plurality of optical information media.

With this structure, it is possible to readily obtain the value indicative of the thickness between layers.

Preferably, the optical information medium is a multilayered disc having "N" layers ($2 \leq N$, N: an integer), and when it is assumed that the reflectance of the i-th layer ($1 \leq i \leq N$, i: an integer) is represented by $R_i$, the thickness between the i-th layer and the j-th layer ($1 \leq j \leq N$, i≠j, j: an integer), the thickness being obtained in the second step, is represented by $d_{ij}$, a refractive index between the i-th layer and the j-th layer is represented by n, a numerical aperture in the measurement optical system is represented by NA, an apparent reflectance corresponding to a ratio of a reflected light amount to an incident light amount upon convergence of light onto the i-th layer in the measurement optical system is represented by $S_i$, and a value θ satisfies a relation of sin θ=NA/n and falls within a range from 0 to $\pi/2$, then, in the third step, "N" equations are established so as to satisfy the equation of $$S_i = R_i + Sd \cdot [\Sigma R_j / \{\pi(2 \cdot d_{ij} \cdot \tan \theta)^2\}]$$

($\Sigma$: addition of integers from 1 to N in a case of $j \neq i$, with regard to j), and the reflectance $R_i$ is obtained in such a manner that the "N" equations for the apparent reflectance $S_i$ are solved with regard to the reflectance $R_i$.

With this structure, it is possible to readily and correctly acquire the reflectance $R_i$, based on the "N" simultaneous equations described above.

Preferably, the optical information medium is a multilayered disc having "N" layers ($2 \leq N$, N: an integer), and when it is assumed that the reflectance of the i-th layer ($1 \leq i \leq N$, i: an integer) is represented by $R_i$, the i-th layer ($1 \leq i \leq N$, i: an integer) is located between the j-th layer ($j = i - 1$) and the "k"th layer ($k = i + 1$), the thickness between the i-th layer and the j-th layer, the thickness being obtained in the second step, is represented by $d_{ij}$, the thickness between the i-th layer and the "k"th layer, the thickness being obtained in the second step, is represented by $d_{ik}$, a refractive index between the respective layers is represented by n, a numerical aperture in the measurement optical system is represented by NA, an apparent reflectance corresponding to a ratio of a reflected light amount to an incident light amount upon convergence of light onto the i-th layer in the measurement optical system is represented by $S_i$, and a value $\theta$ satisfies a relation of $\sin \theta = NA/n$ and falls within a range from 0 to $\pi/2$, then, in the third step, "N" equations are established so as to satisfy the equation of $$S_i = R_i + Sd \cdot [R_j / \{\pi(2 \cdot d_{ij} \cdot \tan \theta)^2\} + R_k / \{\pi(2 \cdot d_{ik} \cdot \tan \theta)^2\}]$$

(in a case of $i=1$, $R_j / \{\pi(2 \cdot d_{ij} \cdot \tan \theta)^2\} = 0$, in a case of $i=N$, $R_k / \{\pi(2 \cdot d_{ik} \cdot \tan \theta)^2\} = 0$), and the reflectance $R_i$ is obtained in such a manner that the "N" equations for the apparent reflectance $S_i$ are solved with regard to the reflectance $R_i$.

With this structure, it is possible to significantly reduce a frequency of calculations and to more readily acquire the reflectance $R_i$, based on the "N" simultaneous equations described above, in such a manner that the influence due to the stray light from other layers to be exerted herein is restricted to that from only the adjacent layer.

Preferably, the optical information medium is a multilayered disc having "N" layers ($2 \leq N$, N: an integer), and when it is assumed that the reflectance of the i-th layer ($1 \leq i \leq N$, i: an integer) is represented by $R_i$, and an apparent reflectance corresponding to a ratio of a reflected light amount to an incident light amount upon convergence of light onto the i-th layer in the measurement optical system is represented by $S_i$, then, in the third step, the reflectance $R_i$ approximates to the apparent reflectance $S_i$.

With this structure, it is possible to significantly reduce a frequency of calculations and to more readily acquire the reflectance $R_i$ by approximation of the apparent reflectance factor $S_i$ obtained by measurement using the measurement optical system, as the reflectance $R_i$.

An optical information medium measurement method according to another aspect of the present invention, for measuring a difference in reflectance in an optical information medium of a multilayered structure having a plurality of information layers includes: a fifth step of obtaining an apparent reflectance corresponding to a ratio between a signal light amount and an incident light amount each obtained upon reproduction of information from each layer of the optical information medium, by use of a measurement optical system, a second step of obtaining a thickness between layers of the optical information medium, a third step of obtaining a reflectance of each layer of the optical information medium, and a sixth step of obtaining a result of conversion as a difference in reflectance for a standard optical system differing from the measurement optical system, from a value indicative of the apparent reflectance obtained in the fifth step, a value indicative of the thickness between layers, the thickness being obtained in the second step, and a value indicative of the reflectance of each layer, the reflectance being obtained in the third step.

With this structure, it is possible to convert, into the difference in reflectance for the unified reference optical system, the difference in reflectance at the optical information medium, the difference in reflectance being measured by any measurement optical system differing from the standard optical system. Therefore, this configuration allows correct comparison of the difference in reflectance even when the optical information medium is subjected to measurement using any measurement optical system, without preparation of a special measurement optical system. Moreover, this configuration has the following effect. That is, it is possible to ensure compatibility of different apparatuses with the optical information medium in such a manner that the optical information medium is subjected to evaluation using the measured value converted into the difference in reflectance at the standard optical system.

Preferably, the optical information medium is a multilayered disc having "N" layers ($2 \leq N$, N: an integer), and when it is assumed that an apparent reflectance corresponding to a ratio of a reflected light amount to an incident light amount upon convergence of light onto the i-th layer ($1 \leq i \leq N$, i: an integer) in the standard optical system is represented by $Sn_i$, then, in the sixth step, the difference in reflectance $\alpha n_{ij}$ between the i-th layer and the j-th layer ($1 \leq j \leq N$, $i \neq j$, j: an integer) is expressed by an equation of $$\alpha n_{ij} = (Sn_i - Sn_j)/(Sn_i + Sn_j).$$

With this structure, it is possible to readily and correctly obtain the result of conversion as the difference in reflectance $\alpha n_{ij}$ for the standard optical system, from the apparent reflectance $Sn_i$.

In the second step, the thickness between layers of the optical information medium may be measured by a measuring machine.

With this structure, the thickness between layers is actually measured in the second So that the more accurate value indicative of the reflectance of each layer can be obtained in the third step. Accordingly, it is possible to more correctly achieve the conversion into the modulation degree $mn_i$ for the standard optical system.

Preferably, in the second step, the thickness between layers of the optical information medium takes a design value upon manufacture of the optical information medium.

With this structure, it is possible to omit the process of measuring the distance between the respective layers of the optical information medium, and to readily obtain the value indicative of the thickness between layers.

Preferably, in the second step, the thickness between layers of the optical information medium takes an average value upon manufacture of the plurality of optical information media.

With this structure, it is possible to readily obtain the value indicative of the thickness between layers.

Preferably, the optical information medium is a multilayered disc having "N" layers ($2 \leq N$, N: an integer), and when it is assumed that the reflectance of the i-th layer ($1 \leq i \leq N$, i: an integer) is represented by $R_i$, the thickness between the i-th layer and the j-th layer ($1 \leq j \leq N$, $i \neq j$, j: an integer), the thickness being obtained in the second step, is represented by $d_{ij}$, a refractive index between the i-th layer and the j-th layer is represented by n, a numerical aperture in the measurement optical system is represented by NA, an apparent reflectance corresponding to a ratio of a reflected light amount to an incident light amount upon convergence of light onto the i-th layer in the measurement optical system is represented by $S_i$, and a value θ satisfies a relation of sin θ=NA/n and falls within a range from 0 to π/2, then, in the third step, "N" equations are established so as to satisfy the equation of $$S_i = R_i + Sd \cdot [\Sigma R_j / \{\pi(2 \cdot d_{ij} \cdot \tan\theta)^2\}]$$

(Σ: addition of integers from 1 to N in a case of j≠i, with regard to j), and the reflectance $R_i$ is obtained in such a manner that the "N" equations for the apparent reflectance $S_i$ are solved with regard to the reflectance $R_i$.

With this structure, it is possible to readily and correctly acquire the reflectance $R_i$, based on the "N" simultaneous equations described above.

Preferably, the optical information medium is a multilayered disc having "N" layers (2≦N, N: an integer), and when it is assumed that the reflectance of the i-th layer (1≦i≦N, i: an integer) is represented by $R_i$, the i-th layer (1≦i≦N, i: an integer) is located between the j-th layer (j=i−1) and the "k"th layer (k=i+1), the thickness between the i-th layer and the j-th layer, the thickness being obtained in the second step, is represented by $d_{ij}$, the thickness between the i-th layer and the "k"th layer, the thickness being obtained in the second step, is represented by $d_{ik}$, a refractive index between the respective layers is represented by n, a numerical aperture in the measurement optical system is represented by NA, an apparent reflectance corresponding to a ratio of a reflected light amount to an incident light amount upon convergence of light onto the i-th layer in the measurement optical system is represented by $S_i$, and a value θ satisfies a relation of sin θ=NA/n and falls within a range from 0 to π/2, then, in the third step, "N" equations are established so as to satisfy the equation of $$S_i = R_i + Sd \cdot [R_j / \{\pi(2 \cdot d_{ij} \cdot \tan\theta)^2\} + R_k / \{\pi(2 \cdot d_{ik} \cdot \tan\theta)^2\}]$$

(in a case of i=1, $R_j / \{\pi(2 \cdot d_{ij} \cdot \tan\theta)^2\}=0$, in a case of i=N, $R_k / \{\pi(2 \cdot d_{ik} \cdot \tan\theta)^2\}=0$), and the reflectance $R_i$ is obtained in such a manner that the "N" equations for the apparent reflectance $S_i$ are solved with regard to the reflectance $R_i$.

With this structure, it is possible to significantly reduce a frequency of calculations and to more readily acquire the reflectance $R_i$, based on the "N" simultaneous equations described above, in such a manner that the influence due to the stray light from other layers to be exerted herein is restricted to that from only the adjacent layer.

Preferably, the optical information medium is a multilayered disc having "N" layers (2≦N, N: an integer), and when it is assumed that the reflectance of the i-th layer (1≦i≦N, i: an integer) is represented by $R_i$, and an apparent reflectance corresponding to a ratio of a reflected light amount to an incident light amount upon convergence of light onto the i-th layer in the measurement optical system is represented by $S_i$, then, in the third step, the reflectance $R_i$ approximates to the apparent reflectance $S_i$.

With this structure, it is possible to significantly reduce a frequency of calculations and to more readily acquire the reflectance $R_i$ by approximation of the apparent reflectance factor $S_i$ obtained by measurement using the measurement optical system, as the reflectance R.

Preferably, the optical information medium is a multilayered disc having "N" layers (2≦N, N: an integer), and when it is assumed that the reflectance of the i-th layer (1≦i≦N, i: an integer) is represented by $R_i$, the thickness between the i-th layer and the j-th layer (1≦j≦N, i≠j, j: an integer), the thickness being obtained in the second step, is represented by $d_{ij}$, a refractive index between the i-th layer and the j-th layer is represented by n, a numerical aperture in the measurement optical system is represented by NA, an apparent reflectance corresponding to a ratio of a reflected light amount to an incident light amount upon convergence of light onto the i-th layer in the measurement optical system is represented by $S_i$, and a value θ satisfies a relation of sin θ=NA/n and falls within a range from 0 to π/2, then, in the third step, a conversion coefficient $a_i$ is expressed by an equation of $$a_i = 1 + Sd \cdot [\Sigma 1 / \{\pi(2 \cdot d_{ij} \cdot \tan\theta)^2\}]$$

(Σ: addition of integers from 1 to N in a case of j≠i, with regard to j), and the reflectance $R_i$ approximates to a relation of $S_i/a_i$.

With this structure, it is possible to more readily calculate the reflectance $R_i$ of the layer incurring no influence due to stray light.

Preferably, the optical information medium is a multilayered disc having "N" layers (2≦N, N: an integer), and when it is assumed that the reflectance of the i-th layer (1≦i≦N, i: an integer) is represented by $R_i$, the thickness between the i-th layer and the j-th layer (1≦j≦N, i≠j, j: an integer), the thickness being obtained in the second step, is represented by $d_{ij}$, a refractive index between the i-th layer and the j-th layer is represented by n, a numerical aperture in the measurement optical system is represented by NA, an apparent reflectance corresponding to a ratio of a reflected light amount to an incident light amount upon convergence of light onto the i-th layer in the measurement optical system is represented by $S_i$, and a value θ satisfies a relation of sin θ=NA/n and falls within a range from 0 to π/2, then, in the third step, a conversion coefficient $a_i$ is expressed by an equation of $$a_i = 1 + Sd \cdot [\Sigma 1 / \{\pi(2 \cdot d_{ij} \cdot \tan\theta)^2\}]$$

(Σ: addition of integers from 1 to N in a case of j≠i, with regard to j), and the reflectance $R_i$ approximates to a relation of $S_i/a_i$.

With this structure, it is possible to more readily calculate the reflectance $R_i$ of the layer incurring no influence due to stray light.

An optical information medium according to still another aspect of the present invention of a multilayered structure having a plurality of information layers is characterized by being measured by an optical information medium measurement method which includes: a first step of measuring a degree of modulation of each layer of the optical information medium, by use of a measurement optical system, a second step of obtaining a thickness between layers of the optical information medium, a third step of obtaining a reflectance of each layer of the optical information medium, and a fourth step of converting the modulation degree of each layer, the modulation degree being measured in the first step, into a modulation degree for a standard optical system differing from the measurement optical system, based on a value indicative of the thickness between layers, the thickness being obtained in the second step, and a value indicative of the reflectance of each layer, the reflectance being obtained in the third step.

As described, a recording apparatus according to yet another aspect of the present invention, for recording information on the optical information medium, the information is recorded by irradiating the optical information medium with a light beam.

As described, a reproducing apparatus according to yet another aspect of the present invention, for reproducing information from the optical information medium of the present invention, for reproducing information from the optical information medium, the information is reproduced by irradiating the optical information medium a light beam.

The present invention relates to an optical information medium measurement method having such a unique effect that a modulation degree, which is measured by a measurement optical system differing from a standard optical system, can be converted into a degree of modulation for the standard optical system, and it is therefore useful as a measurement method for a multilayered disc.

This application is based on US Provisional Application No. 61/096,979 filed on Sep. 15, 2008 and Japanese Patent Application No. 2008-311332 filed on Dec. 5, 2008, the contents of which are hereby incorporated by reference.

Specific embodiments or examples used for the detailed description of the invention are merely for clarifying the technical content of the present invention, and the present invention should not be interpreted within these limited examples, but can be modified in various ways within the sprit of the present invention and scope of the claims described herein below.

What is claimed is:

1. An optical information medium measurement method for measuring a difference in reflectance in an optical information medium having a multilayered structure having a plurality of information layers, the optical information medium measurement method comprising:
    a first step of obtaining, via a measurement optical system, an apparent reflectance of each respective information layer of the plurality of information layers, such that the apparent reflectance of each respective information layer corresponds to a ratio between a signal light amount and an incident light amount obtained while reproducing information from the respective information layer;
    a second step of obtaining a thickness between the plurality of information layers of the optical information medium;
    a third step of obtaining a reflectance of each respective information layer of the plurality of information layers of the optical information medium; and
    a fourth step of obtaining a result of conversion as a difference in a reflectance of each respective information layer for a standard optical system differing from the measurement optical system, the result of conversion being obtained for each respective information layer from a value indicative of the apparent reflectance of the respective information layer, as obtained in the first step, a value indicative of the thickness between the plurality of information layers, as obtained in the second step, and a value indicative of the reflectance of the respective information layer, as obtained in the third step.

2. The optical information medium measurement method according to claim 1,
    wherein the optical information medium has N layers and wherein N is an integer and $N \geq 2$, and
    wherein, when the apparent reflectance corresponding to the ratio of the reflected light amount to the incident light amount upon convergence of light onto an i-th layer ($1 \leq i \leq N$, i being an integer) of the optical information medium in the standard optical system is represented by $Sn_i$, then, in the fourth step, the difference in reflectance $\alpha n_{ij}$ between the i-th layer and a j-th layer ($1 \leq j \leq N$, $i \neq j$, j being an integer) of the optical information medium is expressed by an equation:

$$\alpha n_{ij} = (Sn_i - Sn_j)/(Sn_i + Sn_j).$$

3. The optical information medium measurement method according to claim 1, wherein, in the second step, the thickness between the plurality of information layers is measured by a measuring machine.

4. The optical information medium measurement method according to claim 1, wherein, in the second step, the thickness between the plurality of information layers is a design value upon a manufacture of the optical information medium.

5. The optical information medium measurement method according to claim 1, wherein, in the second step, the thickness between the plurality of information layers is an average value upon a manufacture of a plurality of the optical information mediums.

6. The optical information medium measurement method according to claim 1,
    wherein the optical information medium has N layers and wherein N is an integer and $N \geq 2$,
    wherein, when the reflectance of an i-th layer ($1 \leq i \leq N$, i being an integer) of the optical information medium is represented by $R_j$, (i) the thickness between the i-th layer and a j-th layer ($1 \leq i \leq N$, $i \neq j$, j being an integer) of the optical information medium, as obtained in the second step, is represented by $d_{ij}$, (ii) a refractive index between the i-th layer and the j-th layer is represented by n, (iii) a numerical aperture in the measurement optical system is represented by NA, (iv) the apparent reflectance corresponding to the ratio of the reflected light amount to the incident light amount upon convergence of light onto the i-th layer in the measurement optical system is represented by $S_j$, (v) a value $\theta$ satisfies a relation of $\sin \theta = NA/n$ and falls within a range from 0 to $\pi/2$, and (vi) in the third step, N equations are established so as to satisfy an equation:

$$S_i = R_i + Sd \cdot [\Sigma R_j / \{\pi (2 \cdot d_{ij} \cdot \tan \theta)^2\}]$$

($\Sigma$ being an addition of integers from 1 to N in a case of $j \neq i$, with regard to j), and
    wherein the reflectance $R_i$ is obtained in such a manner that the N equations for the apparent reflectance $S_i$ are solved with regard to the reflectance $R_i$.

7. The optical information medium measurement method according to claim 1,
    wherein the optical information medium has N layers and wherein N is an integer and $N \geq 2$,
    wherein, when the reflectance of an i-th layer ($1 \leq i \leq N$, i being an integer) of the optical information medium is represented by $R_j$, (i) the i-th layer ($1 \leq i \leq N$) is located between a j-th layer (j=i−1) of the optical information medium and a k-th layer (k=i+1) of the optical information medium, (ii) the thickness between the i-th layer and the j-th layer, as obtained in the second step, is represented by $d_{ij}$, (iii) the thickness between the i-th layer and the k-th layer, as obtained in the second step, is represented by $d_{ik}$, (iv) a refractive index between the respective information layers is represented by n, (v) a numerical aperture in the measurement optical system is represented by NA, (vi) the apparent reflectance corresponding to the ratio of the reflected light amount to the incident light amount upon convergence of light onto the i-th layer in the measurement optical system is represented by $S_i$, (vii) a value $\theta$ satisfies a relation of $\sin \theta = NA/n$ and falls within a range from 0 to $\pi/2$, and (viii) in the third step, N equations are established so as to satisfy an equation:

$$S_i = R_i + Sd \cdot [R_j / \pi (2 \cdot d_{ij} \cdot \tan \theta)^2 + R_k / \{\pi (2 \cdot d_{ik} \cdot \tan \theta)^2\}]$$

(in a case of i=1, $R_j / \{\pi (2 \cdot d_{ij} \cdot \tan \theta)^2\} = 0$),
(in a case of i=N, $R_k / \{\pi (2 \cdot d_{ik} \cdot \tan \theta)^2\} = 0$), and
    wherein the reflectance $R_i$ is obtained in such that the N equations for the apparent reflectance $S_i$ are solved with regard to the reflectance $R_j$.

8. The optical information medium measurement method according to claim 1, wherein the optical information medium has N layers and wherein N is an integer and $N \geq 2$, and wherein, when (i) the reflectance of an i-th layer ($1 \leq i \leq N$, i being an integer) of the optical information medium is represented by $R_i$, and (ii) the apparent reflectance corresponding to the ratio of the reflected light amount to the incident light amount upon convergence of light onto the i-th layer in the measurement optical system is represented by $S_i$, then, in the third step, the reflectance $R_i$ approximates to the apparent reflectance $S_i$.

9. A non-transitory optical information medium having a multilayered structure comprising:

a plurality of information layers, wherein the optical information medium is subjected to measurement by an optical information medium measurement method comprising:

a first step of obtaining, via a measurement optical system, an apparent reflectance of each respective information layer of the plurality of information layers, such that the apparent reflectance of each respective information layer corresponds to a ratio between a signal light amount and an incident light amount obtained while reproducing information from the respective information layer;

a second step of obtaining a thickness between the plurality of information layers of the optical information medium;

a third step of obtaining a reflectance of each respective information layer of the plurality of information layers of the optical information medium; and a fourth step of obtaining a result of conversion as a difference in a reflectance of each respective information layer for a standard optical system differing from the measurement optical system, the result of conversion being obtained for each respective information layer from a value indicative of the apparent reflectance of the respective information layer, as obtained in the first step, a value indicative of the thickness between the plurality of information layers, as obtained in the second step, and a value indicative of the reflectance of the respective information layer, as obtained in the third step.

10. A recording apparatus for measuring a difference in reflectance in an optical information medium having a multilayered structure having a plurality of information layers, and for recording information onto the optical information medium, the recording apparatus comprising:

a measurement optical system including a recording signal processing circuit, an objective lens and an optical head, wherein the measurement optical system is operable to:

obtain an apparent reflectance of each respective information layer of the plurality of information layers, such that the apparent reflectance of each respective information layer corresponds to a ratio between a signal light amount and an incident light amount obtained while reproducing information from the respective information layer;

obtain a thickness between the plurality of information layers of the optical information medium;

obtain a reflectance of each information layer of the plurality of information layers of the optical information medium;

obtain a result of conversion as a difference in a reflectance of each respective information layer for a standard optical system differing from the measurement optical system, the result of conversion being obtained for each respective information layer from a value indicative of the obtained apparent reflectance of the respective information layer, a value indicative of the obtained thickness between the plurality of information layers, and a value indicative of the obtained reflectance of the respective information layer; and record the information onto the optical information medium by irradiating the optical information medium with a light beam.

11. A reproducing apparatus for measuring a difference in reflectance in an optical information medium having a multilayered structure having a plurality of information layers, and for reproducing information from the optical information medium, the reproducing apparatus comprising:

a measurement optical system including a reproduction signal processing circuit, an objective lens and an optical head, wherein the measurement optical system is operable to:

obtain an apparent reflectance of each respective information layer of the plurality of information layers, such that the apparent reflectance of each respective information layer corresponds to a ratio between a signal light amount and an incident light amount obtained while reproducing information from the respective information layer;

obtain a thickness between the plurality of information layers of the optical information medium;

obtain a reflectance of each information layer of the plurality of information layers of the optical information medium;

obtain a result of conversion as a difference in a reflectance of each respective information layer for a standard optical system differing from the measurement optical system, the result of conversion being obtained for each respective information layer from a value indicative of the obtained apparent reflectance of the respective information layer, a value indicative of the obtained thickness between the plurality of information layers, and a value indicative of the obtained reflectance of the respective information layer; and reproduce the information from the optical information medium by irradiating the optical information medium with a light beam.

* * * * *